US011379833B2

(12) United States Patent
Hinkel et al.

(10) Patent No.: US 11,379,833 B2
(45) Date of Patent: Jul. 5, 2022

(54) SYSTEMS AND METHODS OF GENERATING, VALIDATING, APPROVING, RECORDING, AND UTILIZING DIGITAL DATA ASSETS IN A BLOCKCHAIN PLATFORM USING A TRANSACTIONAL PROOF OF WORK

(71) Applicants: Jennifer M. Hinkel, Incline Village, NV (US); Arka Ray, Los Angeles, CA (US)

(72) Inventors: Jennifer M. Hinkel, Incline Village, NV (US); Arka Ray, Los Angeles, CA (US)

(73) Assignee: THE DATA ECONOMICS COMPANY, Hollywood, CA (US)

(*) Notice: Subject to any disclaimer, the term of this patent is extended or adjusted under 35 U.S.C. 154(b) by 0 days.

(21) Appl. No.: 16/383,012

(22) Filed: Apr. 12, 2019

(65) Prior Publication Data
US 2019/0318350 A1  Oct. 17, 2019

Related U.S. Application Data

(60) Provisional application No. 62/657,261, filed on Apr. 13, 2018.

(51) Int. Cl.
*G06Q 40/00* (2012.01)
*G06Q 20/38* (2012.01)

(52) U.S. Cl.
CPC ....... *G06Q 20/389* (2013.01); *G06Q 2220/00* (2013.01)

(58) Field of Classification Search
CPC .............................. G06Q 40/00; G06F 17/30
USPC ........................................................ 705/44
See application file for complete search history.

(56) References Cited

U.S. PATENT DOCUMENTS

| 2015/0332283 | A1  | 11/2015 | Witchey |
| 2018/0083786 | A1  | 3/2018  | Dierks et al. |
| 2018/0089638 | A1  | 3/2018  | Christidis et al. |
| 2018/0294955 | A1* | 10/2018 | Rhie ........................ G06F 16/27 |

* cited by examiner

*Primary Examiner* — Ojo O Oyebisi
(74) *Attorney, Agent, or Firm* — Fox Rothschild LLP; Carol E. Thorstad-Forsyth

(57) ABSTRACT

A method of performing block generation may include receiving a request from one or more sources that includes task data associated with one or more tasks for an economy, context information, and an indication of a blockchain of a blockchain matrix to which the task data pertains. The method includes determining whether the task data corresponds to a qualifying transaction for the economy for recording in the blockchain and, if so, determining whether to approve recordation of the qualifying transaction to the blockchain. In response to approving recordation of the transaction, generating a new block for the blockchain that includes the qualifying transaction, and adding the new block to the blockchain.

20 Claims, 10 Drawing Sheets

SYSTEMS AND METHODS OF GENERATING, VALIDATING, APPROVING, RECORDING, AND UTILIZING DIGITAL DATA ASSETS IN A BLOCKCHAIN PLATFORM USING A TRANSACTIONAL PROOF OF WORK

RELATED APPLICATIONS AND CLAIM OF PRIORITY

This patent document claims priority to U.S. Patent Application No. 62/657,261, filed Apr. 13, 2018, the disclosure of which is fully incorporated in its entirety into this document by reference.

BACKGROUND

Blockchain data structures provide significant benefits for data management and processing, and can be used in conjunction with other technologies to address business problems encountered across industries. For instance, blockchain data structures can facilitate an immutable audit and tracking trail, as well as the ability to perform "trustless" transactions based on consensus mechanisms. In addition, blockchain data structures offer security mechanisms for preventing fraud, falsification, or tampering related to data or algorithms stored in such data structures. Furthermore, transaction data stored in a blockchain data structures has often been validated by financial markets to be able to server as a trusted basis for financial transactions including those related to capital markets, investments, and currency trading.

SUMMARY

In various embodiments, a method of performing block generation may include receiving, by an electronic device, a request from one or more sources, where the request includes task data associated with one or more tasks for an economy, context information, and an indication of a blockchain of a blockchain matrix to which the task data pertains. The method includes identifying a first controller that is associated with the blockchain, identifying a second blockchain of the blockchain matrix that is associated with the context information, identifying a second controller that is associated with the second blockchain, and determining, by the first controller, whether at least a portion of the task data corresponds to a qualifying transaction for the economy for recording in the blockchain. The method includes, in response to determining that the task data corresponds to a qualifying transaction for recording in the blockchain, determining by the second controller whether to approve recordation of the qualifying transaction to the blockchain, in response to approving recordation of the transaction, generating, by the first controller, a new block for the blockchain that includes the qualifying transaction; and adding the new block to the blockchain.

The task data may include data obtained by one or more of the following: a mobile electronic device, a wearable electronic device, a computing device, or a gaming electronic device.

Determining whether the task data corresponds to a qualifying transaction for the economy recording in the blockchain may include determining whether a task has been completed by determining whether at least a portion of the task data satisfies a definition of one or more completed tasks for the economy, and in response to determining that the task has been completed, determining whether the qualifying transaction of a transaction type exists by determining whether the task satisfies a definition of the qualifying transaction or whether the task in combination with at least a portion of previously identified tasks satisfies the definition of the qualification transaction.

Recording the transaction to the blockchain may include adding the qualifying transaction to a qualifying transaction pool, determining whether a threshold level associated with the transaction type is satisfied by determining whether one or more qualifying transactions in the qualifying transaction pool individually or collectively satisfy the threshold level associated with the transaction type, and in response to determining that the threshold level associated with the transaction type is satisfied, generating a digital data asset comprising data pertaining to the one or more qualifying transactions in the qualifying transaction pool. The new block may include the digital data asset.

In response to determining that the task data does not correspond to a qualifying transaction for recording in the blockchain, the method may include storing the task data in a data store that is separate from a qualifying transaction pool that stores qualifying transactions for the economy. The digital data asset may include data pertaining to at least a portion of the task data that does not correspond to the qualifying transaction that is stored in the data store.

The threshold level may define one or more conditions. Determining whether the threshold level associated with the transaction type is satisfied may include determining whether the qualifying transactions in the qualifying transaction pool satisfy the one or more conditions.

Optionally, in response to determining that the task data does not correspond to a qualifying transaction for recording in the blockchain, the method may include discarding the task.

Optionally, the first blockchain and the second blockchain are the same blockchain.

The new block may include a unique identifier a transaction data list that includes information pertaining to one or more qualifying transactions associated with the digital data asset. The new block may include a cryptographic reference to one or more previous blocks in the blockchain.

In various embodiments, a system for performing block generation includes one or more electronic devices, and a computer-readable storage medium having one or more programming instructions that, when executed, cause one or more of the electronic devices to receive a request from one or more sources, where the request includes task data associated with one or more tasks for an economy, context information, and an indication of a blockchain of a blockchain matrix to which the task data pertains. The computer-readable storage medium has one or more programming instructions that, when executed, cause one or more of the electronic devices to identify a first controller that is associated with the blockchain, identify a second blockchain of the blockchain matrix that is associated with the context information, identify a second controller that is associated with the second blockchain, determine whether at least a portion of the task data corresponds to a qualifying transaction for the economy for recording in the blockchain, in response to determining that the task data corresponds to a qualifying transaction for recording in the blockchain, determine whether to approve recordation of the qualifying transaction to the blockchain, in response to approving recordation of the transaction, generate a new block for the blockchain that includes the qualifying transaction, and add the new block to the blockchain.

The task data may include data obtained by one or more of the following: a mobile electronic device, a wearable electronic device, a computing device, or a gaming electronic device.

Optionally, the one or more programming instructions that, when executed, cause one or more of the electronic devices to determine whether the task data corresponds to a qualifying transaction for the economy recording in the blockchain comprise one or more programming instructions that, when executed, cause one or more of the electronic devices to determine whether a task has been completed by determining whether at least a portion of the task data satisfies a definition of one or more completed tasks for the economy, and in response to determining that the task has been completed, determine whether the qualifying transaction of a transaction type exists by determining whether the task satisfies a definition of the qualifying transaction or whether the task in combination with at least a portion of previously identified tasks satisfies the definition of the qualification transaction.

The one or more programming instructions that, when executed, cause one or more of the electronic devices to record the transaction to the blockchain may include one or more programming instructions that, when executed, cause one or more of the electronic devices to add the qualifying transaction to a qualifying transaction pool, determine whether a threshold level associated with the transaction type is satisfied by determining whether one or more qualifying transactions in the qualifying transaction pool individually or collectively satisfy the threshold level associated with the transaction type, and in response to determining that the threshold level associated with the transaction type is satisfied, generate a digital data asset comprising data pertaining to the one or more qualifying transactions in the qualifying transaction pool. The new block may include the digital data asset.

The computer-readable storage medium may include one or more programming instructions that, when executed, cause one or more of the electronic devices to, and in response to determining that the task data does not correspond to a qualifying transaction for recording in the blockchain, store the task data in a data store that is separate from a qualifying transaction pool that stores qualifying transactions for the economy. The digital data asset may include data pertaining to at least a portion of the task data that does not correspond to the qualifying transaction that is stored in the data store.

Optionally, the threshold level defines one or more conditions. The one or more programming instructions that, when executed, cause one or more of the electronic devices to determine whether the threshold level associated with the transaction type is satisfied may include one or more programming instructions that, when executed, cause one or more of the electronic devices to determine whether the qualifying transactions in the qualifying transaction pool satisfy the one or more conditions.

The computer-readable storage medium may include one or more programming instructions that, when executed, cause one or more of the electronic devices to, in response to determining that the task data does not correspond to a qualifying transaction for recording in the blockchain, discard the task.

Optionally, the first blockchain and the second blockchain may be the same blockchain.

Optionally, the new block may include a unique identifier, and a transaction data list comprising information pertaining to one or more qualifying transactions associated with the digital data asset. The new block may include a cryptographic reference to one or more previous blocks in the blockchain.

DETAILED DESCRIPTION

Figure 1A:
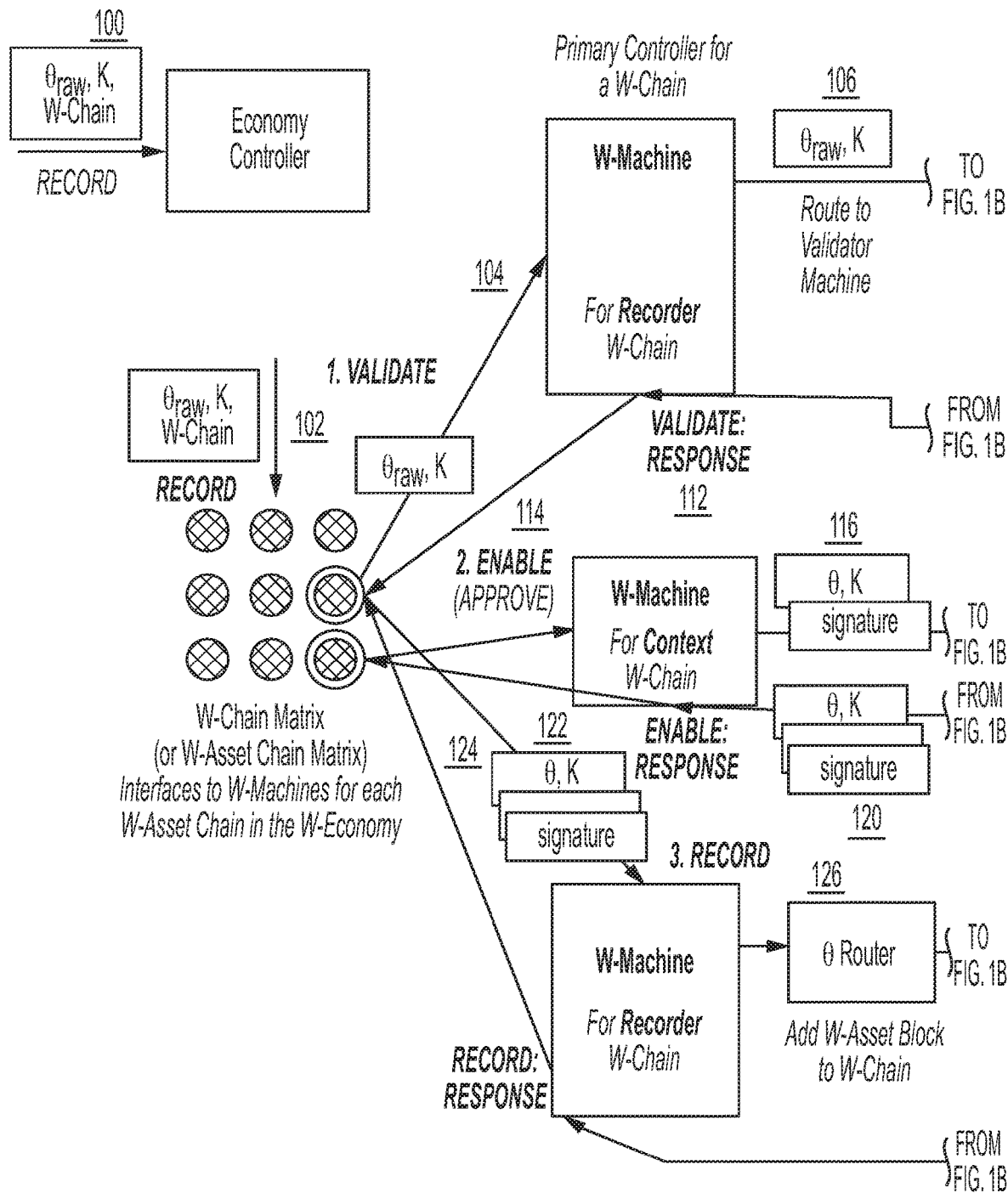
FIGS. 1A and 1B illustrates a diagram of an example platform and methodology for generating a digital data asset according to an embodiment.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

The following terms shall have, for purposes of this application, the respective meanings set forth below:

A "blockchain" refers to a distributed data structure comprised of blocks that are linked together. A block refers to a data structure that is linked to one or more other data structures such as, for example, one or more other blocks. A blockchain may store content that is cryptographically signed to protect the content from unauthorized access, tampering or modification.

A "computing device", "electronic device", or "computer" refers a device or system that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, mobile electronic devices such as smartphones, Internet-connected wearables, tablet computers, laptop computers, and appliances and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

This disclosure describes a technology platform for transforming, encrypting, verifying and simplifying data streams from multiple sources for use in business analytics and decision adjudication, predictive analytics, conditional financial transactions and/or longitudinal outcome evaluations. The data streams represent measured real-world events and therefore can be used for analysis or evaluations having a quantifiable impact or measureable value. This disclosure also describes a system and method of performing a transactional proof of work to secure a digital data asset via the platform and to arrange such secured digital data assets in such a manner that allows for interoperability and trading, and that allows the secured digital data assets to serve as additional data streams that can be fed back into the platform for further processing.

Figure 1B:
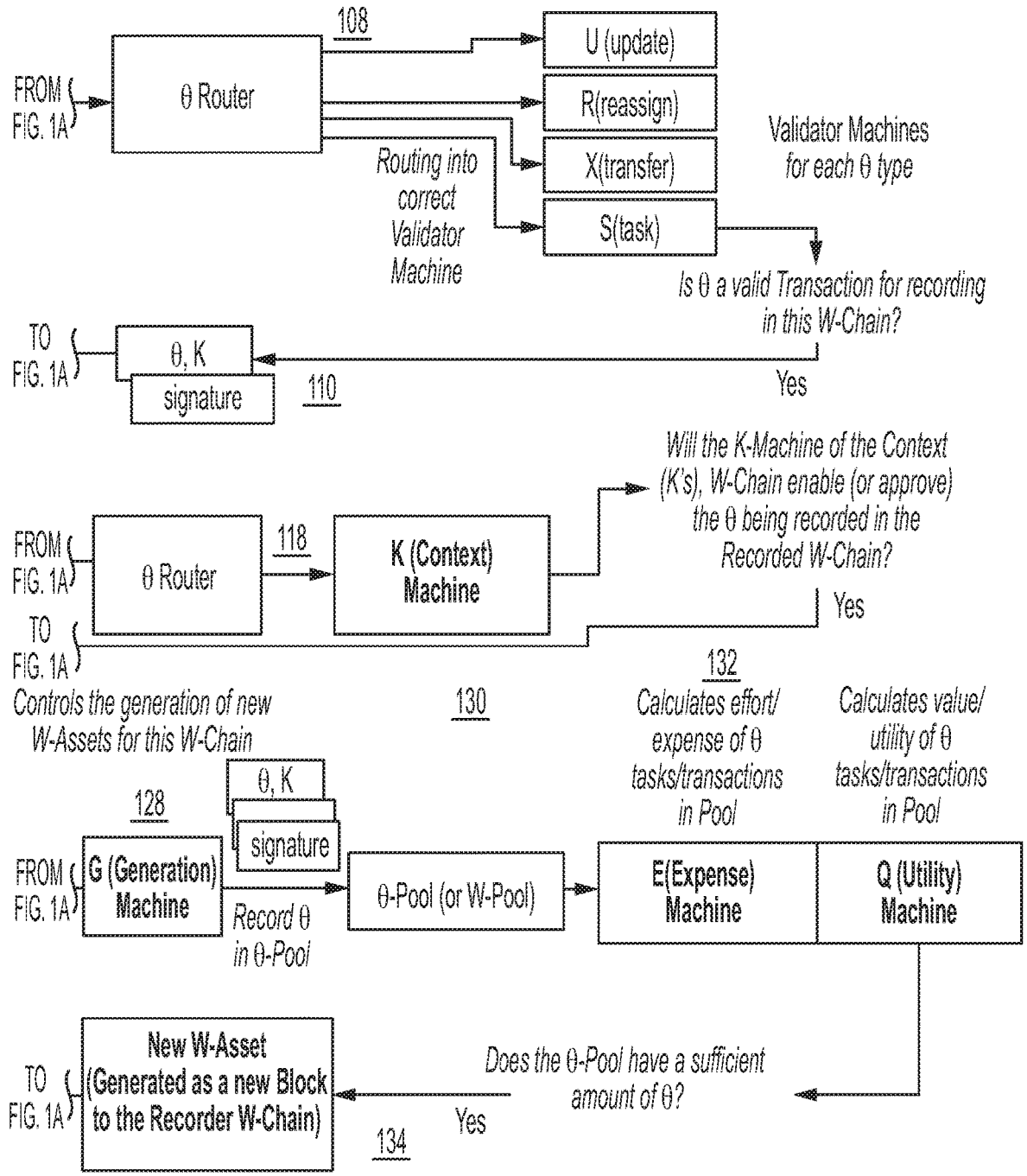
Figure 2:
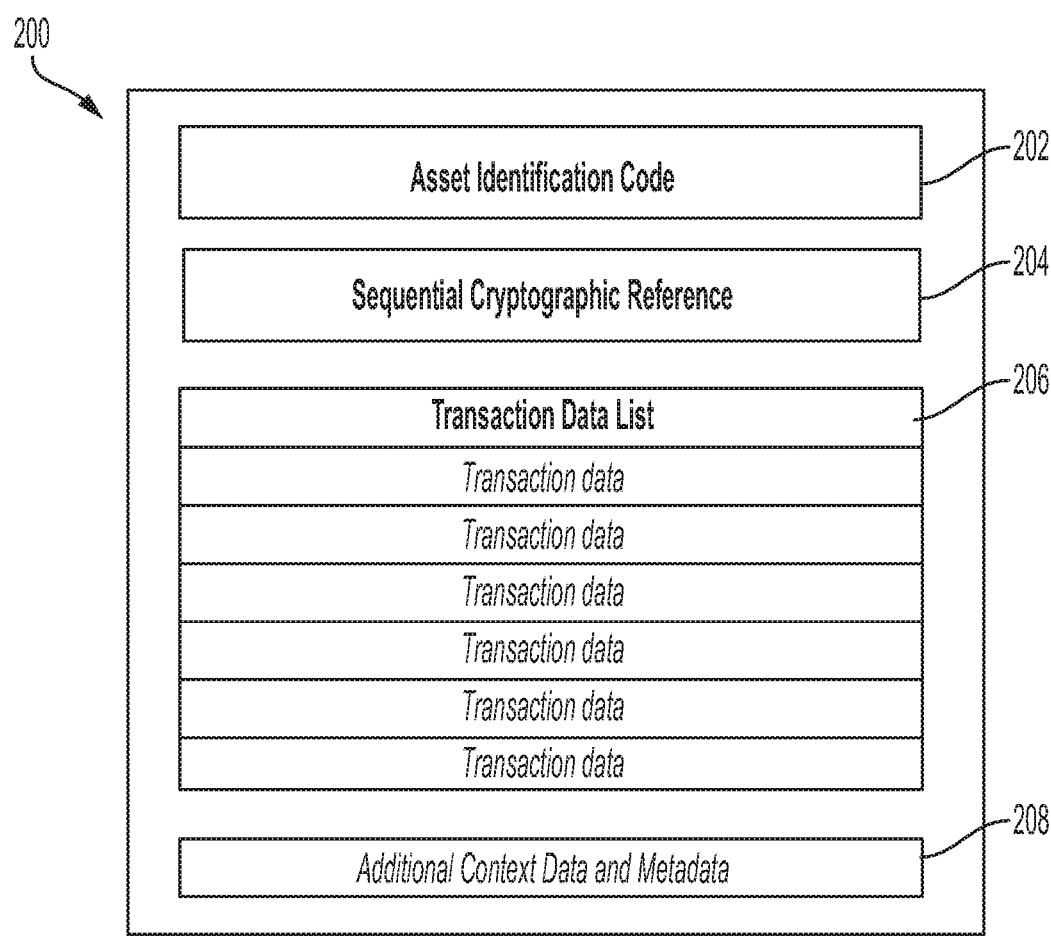
FIG. 2 illustrates an example W-block according to an embodiment.

FIGS. 1A and 1B illustrates a diagram of an example platform and methodology for generating a digital data asset according to an embodiment. A digital data asset refers to a collection of data that is uniquely identifiable and has a value. In an embodiment, a digital data asset may be representative of an action that is to be taken, a credit, discount or bonus that has been earned and/or the like. A digital data asset may be a block of a blockchain as discussed in more detail below. FIG. 2 illustrates an example representation of a block (such as, for example, a W-block as discussed in more detail later in this disclosure) according to an embodiment.

As illustrated in FIG. 2, a block (such as, for example, a W-block) 200 may include a unique block identification code 202. A unique block identification code may be a random or pseudo-random identifier assigned to the digital data asset by the system when it is created.

A block 200 may also include a cryptographic reference 204. A cryptographic reference 204 may be a signature associated with the block. In the situation where the block is a block of a blockchain, the cryptographic reference 204 may be a result of applying a cryptographic operation on the cryptographic reference (e.g., signature) of a block that precedes the current block in the blockchain. Alternatively, the cryptographic reference 204 may be the result of applying a cryptographic operation on at least a portion of the data contained in the block that precedes the current block in the blockchain. For example, the cryptographic reference 204 may be a result of applying a cryptographic hash function on the content or data of the block that precedes the current block in the blockchain. This process inextricably links blocks together in the blockchain such that modification of the content of one block will require modification of the content of previous blocks in the chain. To the extent a block is the first in a blockchain, then its cryptographic reference may not be based on a preceding block because no block precedes it in the blockchain. If this is the case, the cryptographic reference 204 of the block may be a result of performing a cryptographic operation on at least the content of the block.

As illustrated in FIG. 2. In various embodiments, a block 200 may be divided into shares or sub-units. A share or sub-unit refers to a portion of a block (or a portion of the content of a block) that is less than the entire block itself. An individual's total ownership of digital data assets described by a W-chain may be determined by a summation of ownership and transfer data defined across the qualifying transactions held in the current block and previous blocks of that W-chain. For example, a digital data asset may be divided into one or more sub-units, which may be assigned or re-assigned to different owners, such as, for example, participants in an economy.

A block 200 may include a list of transaction data 206 according to an embodiment. The transaction data may include, without limitation, information about one or more qualifying transactions and/or non-qualifying transactions of an economy. A block 200 may include additional data 208 including, without limitation, data related to context or metadata that may be used by one or more machines or an economy controller to process or otherwise handle a block within the system.

In various embodiments, a digital data asset may be specific to an economy. An economy (referred to throughout this disclosure as an economy or a W-economy) refers to an environment that is defined in terms of one or more parameters. In an embodiment, a W-economy may be defined in terms of one or more of the following, or any combination of the following: participants, qualifying tasks, qualifying outcomes, W-chains, W-assets, qualifying transactions (W-transactions), and machines (e.g., data market machines), as explained in more detail below.

In various embodiments, a digital data asset may be specific to a data economy. A data economy refers to a set of interconnected data markets where participants can trade or utilize data to gain new value (e.g., goods and/or services) based on one or more rules agreed upon by the economy participants. A data market refers to a set of rules (e.g., one or more programming instructions) that may be used to generate, record, manage, self-regulate and/or trade a specific type(s) of data asset. A data market may be associated with one or more machines that may operate within that data market. In various embodiments, a W-economy may be considered a type of data economy—for example, one that is built on data that represents the outcomes of work performed.

Participants refer to people, organizations, entities, objects, machines (physical or virtual) or other players in a W-economy. These participants may decide on a finite set of outcomes that are considered valuable to the participants. An outcome represents data, such as one or more measurements, that indicate the completion of an event in the real world.

The set of outcomes selected and defined by participants of a W-economy are referred to in this disclosure as qualifying outcomes or qualifying tasks.

The subgroup of participants that is required to come to agreement and define this finite set of valuable outcomes may be referred to as a consensus domain. W-economy participants outside of the consensus domain combined with participants inside the consensus domain may be referred to as a trust domain.

In an embodiment, participants may decide on a set of tasks that may be used to achieve one or more of the qualifying outcomes. A task refers to a pre-defined methodology, algorithm, process or approach for achieving a qualifying outcome. Tasks that are selected by participants of a W-economy are referred to in this disclosure as qualifying tasks. Qualifying tasks together with qualifying outcomes for a W-economy are referred to as a qualifying transaction. A qualifying transaction may represent those sets of qualifying tasks and/or qualifying outcomes that, once processed by a validator machine (as explained in more detail below), have been determined to meet one or more criteria.

In an embodiment, participants may decide to create a set of digital data assets. The digital data assets may be particular to a W-economy. A digital data asset may represent transferrable stores of value for the W-economy. A digital data asset may comprise a data market (comprising data market machines) and one or more data instances. A data instance may be one or more W-blocks which stores at least a portion of one or more qualifying transaction data and/or other data which comprises the W-context of the data asset. A W-context may include information that is not part of a qualifying transaction itself, but that may be recorded as part of a block. Examples of information that may be included as part of a W-context includes, without limitation, metadata, non-qualifying transactions, and/or the like.

A W-block refers to a block of a blockchain. For example, a W-block may be a block of a blockchain created by the transactional proof of work mechanisms described in this disclosure.

In an embodiment, a digital data asset may represent a different type of value to a W-economy based on the qualifying outcomes, assigned utility, and/or qualifying tasks associated with the W-Economy. Each digital data asset may be represented by one or more blockchains, referred to as W-asset chains or W-chains in this disclosure.

A W-block may record one or more of the transactions that caused it to be created, such as qualifying completed tasks or transfers of assets. Transactions that are recorded by a W-chain in a W-economy are referred to as qualifying transactions or W-transactions in this disclosure.

Figure 3:
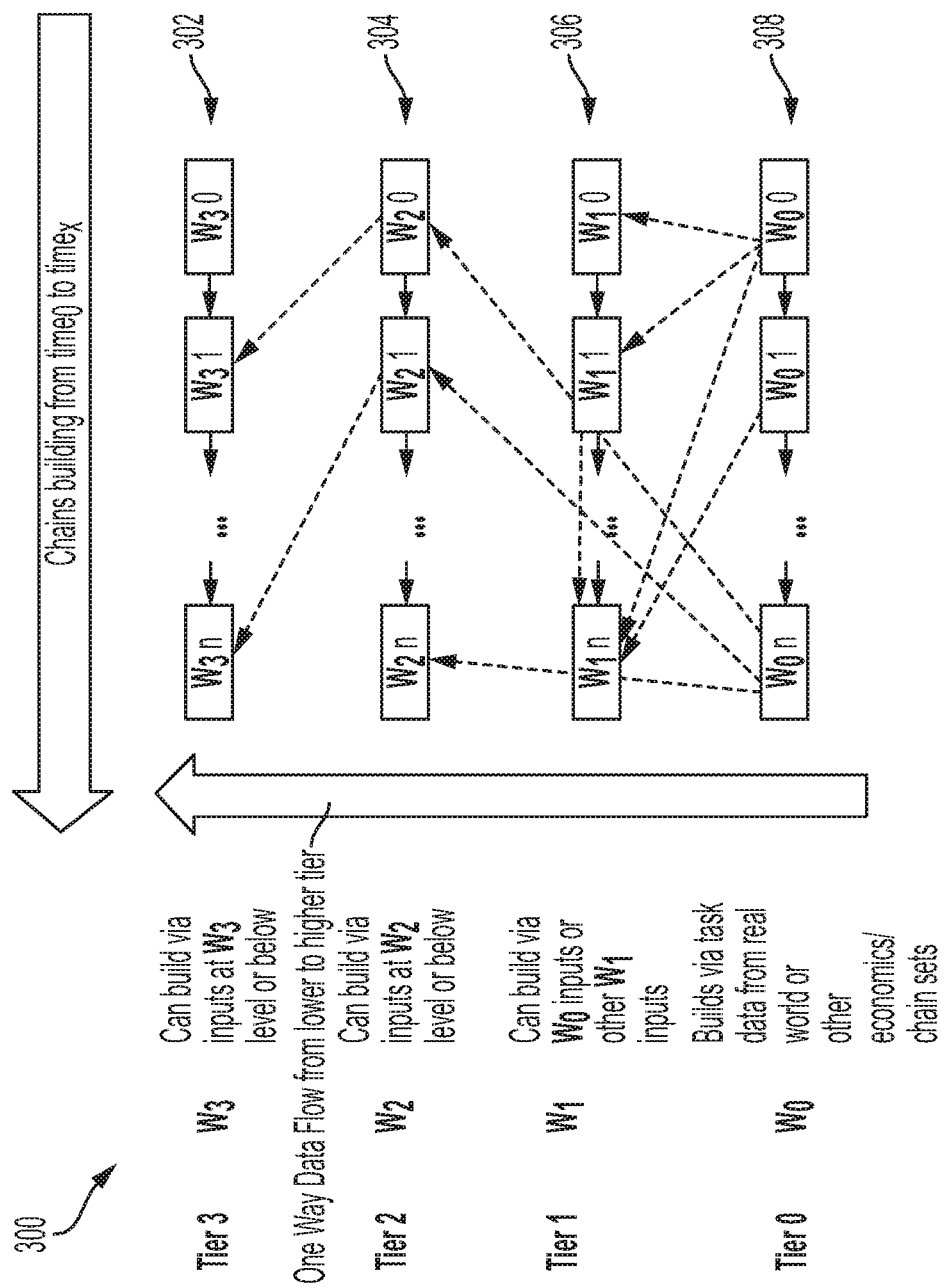
FIG. 3 illustrates W-chain matrix according to an embodiment.

In an embodiment, a W-economy may be associated with a W-chain matrix. A W-chain matrix refers to a set of W-assets that are created from data representing qualifying transactions within a W-economy. In various embodiments, a W-asset may be a digital data asset that is associated with or which is a part of a W-chain. FIG. 3 illustrates an example W-chain matrix according to an embodiment. The W-chain matrix 300 illustrated in FIG. 3 includes four W-chains 302, 304, 306, 308 that are interconnected to form an example W-chain matrix. Additional tiers of W-chains and additional and/or alternate connections between and amongst the tiers may be used within the scope of this disclosure. A W-chain may derive its data from another W-chain. In certain embodiments, a W-asset may enable qualifying transactions that involve other W-assets.

Each W-asset may be associated with one or more machines. A machine may be an electronic device and/or one or more programming instructions that, when executed, cause an electronic device to perform one or more actions. A machine may be a physical device and/or a virtual one. In various embodiments, a controller may be an electronic device and/or one or more programming instructions that, when executed, cause an electronic device to perform one or more actions. A controller may be a physical device and/or a virtual one.

In various embodiments, a W-asset or digital data asset may be categorized as to different types. A representative W-asset may represent (for example, and without limitation, as a symbol or pointer to) one or more materials, goods, performance, or other assets or actions occurring as events in the physical world. As examples, a W-asset may represent some unit of real world currency (e.g., a US dollar) or may represent a physical product or object (e.g., a package of medicines sold). A virtual (or computed) W-asset may represent performance computed from other representative or virtual assets (or from raw task data) that does not have a direct correlation in goods, products, events, or services that are assets or actions in the physical world. As an example, a virtual W-asset may represent the performance of a drug/medicine exceeding its expected results in delivering a health outcome. As another example, a virtual W-asset may represent the tracking of the average cost of several drugs/medicines with a similar mechanism of action across multiple drugs (with multiple NDCs as identifiers) from multiple drug manufacturers. A hybrid W-asset may contain data that represents some combination of real world and computed data.

In an embodiment, a unary W-asset may represent a single unit of something—physical or virtual. As an example, a unary W-asset may be generated every time enough data is collected to award a +−1% rebate to a participant of a W-economy representing a value based agreement in pharmaceutical sciences. Within a data market, a unitary W-asset may be defined what the single unit is or the level of granularity allowed. Depending on the W-economy, a unitary W-asset may be one cent, a tenth of cent, a single patient, a single dose, a single widget, and/or other similar measurement.

In an embodiment, a composite asset may represent one or more units of value, usually combined due to their happening in the same or similar period of time that was being used to generate the W-asset. As an example, a W-asset that represents that during the month of January a patient spent 30,141 cents (units of currency) on hospital visits may be a composite asset. Likewise, a digital data asset that represents a 0.15% rebate reduction that a drug manufacturer owes a payer (i.e., the payer will receive a reduced rebate from the manufacturer) based on the performance of a drug over a period of time according to the terms of a value based agreement may be considered a composite asset. Composite assets may be broken down into corresponding unary assets, if the smallest unit value allowed by the unary asset's data market corresponds to the granularity required by the composite assets data to be transferred without loss.

A W-asset (and therefore a W-chain in general) may only be operated on by certain machines. For example, a W-asset may only be operated on by certain machines that are specific to its W-economy. A machine may control and/or maintain one W-asset chain. However, it may also control any number of other machines (referred to in this disclosure as sub-machines). As such, any machine may be comprised of any number of other machines. This disclosure describes various different types of machines that may operate on a W-chain, such as, for example: primary/interface machines, validators, evaluators, generators and context processors. However, it is understood that fewer, additional and/or alternate machines may be used within the scope of this disclosure.

In various embodiments, a W-chain may store one or more of its machines (e.g., data market machines) as part of the information stored in its W-blocks. An economy controller may send a request for the latest qualifying update transaction stored in the W-chain and may receive a response that may include information it may use to find the most updated machine(s). The qualifying update transaction may include as its transaction data the program(s) or programming instructions that comprise the data market machines specific to the economy. The economy controller may be responsible for routing tasks, qualifying tasks, and/or qualifying transaction to the appropriate machines and directing the machines to begin their specific responsibilities, as described in more detail below.

A primary/interface W-machine for a W-Chain is referred to in this disclosure as a W-machine. A W-machine may be considered the primary owner of a W-chain within a W-economy and is responsible for keeping the W-chain synched with economy controllers associated with other economies (economy controllers are discussed later in this disclosure). A W-machine may also control a number of other machines, and may use these machines to operate the underlying W-chain. For example, a generation machine (or G-machine) that is controlled by a W-machine may be responsible for adding new W-transactions to the W-pool and determining when a new W-block should be generated as described in more detail below.

A validator machine may process incoming raw data from an economy controller to determine whether a transaction is a W-transaction (e.g., qualifying transaction) should be recorded in a W-block. For example, a validator machine may compare at least a portion of the incoming raw data to one or more rules, definitions or other criteria that may define a qualifying transaction for the economy. There may be a type of validator machine for each type of W-transaction, and more may be added as new types of W-transactions become part of the W-economy.

In an embodiment, examples of validator machines may include, without limitation, S-machines, X-machines, R-machines, and U-machines, as discussed in more detail later in this disclosure.

In an embodiment, one or more W-transactions may be handled by one or more S-machines. An S-machine may use task data to determine whether the tasks represented by the task data are representative of one or more valid transactions suitable for recording in a W-chain. For instance, an S-machine may determine whether a task has been completed. An S-machine may do so by determining whether at least a portion of the task data satisfies a definition of one or more completed tasks for the W-economy.

In an embodiment, the transfer of one or more W-transactions, such as the transfer of W-blocks or a share of a W-block, from one participant to another, may be handled by one or more X-machines. An X-machine may use task data to confirm and/or effect transfer of one or more W-blocks from one participant to another.

In an embodiment, the reassignment of one or more W-transactions (e.g., the assignment of ownership of one or more W-blocks, including without limitation, W-blocks that have not yet be generated, from one participant to another) may be handled by one or more R-machines. An R-machine may use task data to record information pertaining to reassignment of W-blocks. For instance, task data may include an indication that the next time that Participant A is to be issued a W-block, that W-block should instead be issued to Participant B.

In an embodiment, updating one or more rules associated with a W-chain (such as the set of corresponding machines or metadata) may be handled by one or more U-machines. These rules may correspond to definitions or names of W-assets, definitions of qualifying tasks, qualifying transactions and/or the like.

In an embodiment, a W-block refers to a block of a W-chain. In certain embodiments, a W-block may itself include a digital data asset or an instance of a digital data asset.

In an embodiment, one or more evaluator machines may process one or more W-transactions (as determined by the appropriate validator machine). In certain embodiments, an evaluator machine may be a type of data market machine. An evaluator machine may be an electronic device or one or more programming instructions that, when executed, cause an electronic device to perform one or more actions. An evaluator machine may assign a value to a W-transaction. This value may be specific to a W-economy and/or an evaluator machine. For example, an evaluator machine may determine that the utility of a W-transaction for a W-chain to be very low. However, another evaluator machine may consider the value of the W-transaction to be much higher for the W-chain. As such, an assigned value may represent the will and priorities of the participants who control the evaluator machine. This disclosure describes two types of evaluator machines. However, it is understood that additional, fewer or alternate evaluator machines may be used within the scope of this disclosure.

An example evaluator machine is an Expense Machine or E-machine. An E-machine may generate a value representing the expense incurred to perform the W-transaction. The expense may be a currency amount, or it may be a function of any set of inputs that an economy's participants find relevant in determining the cost of resources for W-transactions (including tasks). It is understood that additional or alternate types of E-machines may be used within the scope of this disclosure, including, without limitation, those described later in this disclosure.

Another example of an evaluator machine is a utility machine (also referred to in this disclosure as a Q-machine). A Q-machine may generate a value representing the utility of a W-transaction to a W-economy. Specific utility values may be agreed upon by the participants of an economy. In various embodiments, the quality values and criteria (e.g., one or more rules, definitions, and/or the like) for assignment of these values may be stored in a data store associated with a Q-machine. The criteria may be based on data pertinent to a transaction and/or data pertinent to a preceding transaction in a block, data associated with transactions in preceding blocks of a W-chain and/or the like.

For example, a W-economy may determine that it values longer lifespans for participants. A W-transaction representing a task performed to provably prolong someone's life may be given a higher value by a Q-machine of a W-chain versus the Q-machine associated with a different W-economy. It is understood that additional or alternate types of U-machines may be used within the scope of this disclosure, including, without limitation, those described later in this disclosure.

In an embodiment, a W-economy may include one or more generator machines (each referred to in this disclosure as a G-machine). A G-machine may be an electronic device or one or more programming instructions that, when executed, cause an electronic device to perform one or more actions. A G-machine may be responsible for adding W-transactions to a W-pool. A W-pool may be a data store or other data structure that may hold or store one or more W-transactions in escrow until the condition(s) for the generation of a new W-block containing these W-transactions is produced. A G-machine may analyze the W-pool (such as by using the Q-machine and E-machine for a W-chain) to determine if the conditions for generating the new W-block have been met. If so, the G-machine may ask the W-chain to create a new block using the W-transactions in the W-pool.

In various embodiments, a G-machine may return a number of side-effect requests to the W-machine to pass along to the economy controller of a W-economy. These side-effect requests may represent one or more new W-transactions that may be generated as a result of a W-transaction being recorded in the W-pool and/or a new W-block that has been generated.

In an embodiment, context machines (referred to in this disclosure as K-machines) may be the approvers or enablers of one or more W-transactions. A context for a W-block may refer to the data that is pertinent to a W-block (and by extension, the W-chain) to participants in a W-economy. A W-block may derive its context data from one or more sources. For example, a W-block may derive its context data from the set of W-transactions that it contains (which may be referred to in this disclosure as its specie). This may be a set of W-transactions that are native to the W-block, or W-transactions that it derives from its parent W-chain. The data contained within a W-block may have a meaning to the W-economy, as this data represents data from outcomes that the W-economy has deemed meaningful and/or valuable to its participants. As such, these participants, through the W-chain machines, may make decisions and/or predictions about the future using the W-Block's W-transaction context. The context data that a W-block derives from its specie is referred to in this disclosure as the W-block's static context or specie context.

A K-machine, as the approver or enabler of one or more W-transactions, may also provide a utilization function for one or more digital data assets. For example, a K-machine may define how a digital data asset can be used in the present and/or the future. This is a different functionality than that provided by, for example, a U-machine or a Q-machine, which analyzes a set of transactions and outputs a utility value for the data set.

In an embodiment, a W-block may be transferred and evaluated as a store of value within a W-economy (such as for tasks performed, or in exchange for some other form of value that may be described by a W-transaction). As a W-block becomes part of W-transactions beyond the W-block itself, the associated W-asset may build a history that represents the value that was generated by the circulation of the W-block (or the data it contains) within the W-economy. This historical context, which may include the entire set of data (set of W-transactions) from the W-chain involving this W-block, may be a candidate for transfer and/or as an asset providing context for a W-transaction. This historical context may be referred to as a dynamic context or historical context.

In an embodiment, the static context and dynamic context of a W-block may form the W-block's context. The W-transactions within a W-block may provide a W-block's context. However, the smallest unit provider of context for a W-economy may be a single W-transaction. Similarly, while a W-chain may not technically be a context provider by itself, multiple W-blocks from the same W-chain may provide context for the same W-transaction (or set of W-transactions), which are referred to as combined contexts. As such, all of the W-blocks in a W-chain may together provide a single combined context (provide context data for the same set of W-Transactions). To say that the context of a W-transaction is a W-chain implies that the combined context for that W-transaction comprises all the W-transactions in all W-blocks of the W-chain. Further, W-blocks from multiple W-chains may also combine to provide a single combined context in this case, where the combine context includes data from all the W-blocks from the different W-chains.

In an embodiment, a K-machine may evaluate a context, K, (which may be combined or from a single W-block) that is attached to a request to record a W-transaction, and makes a decision whether to approve or not approve the W-transaction. This is a different analysis than validating whether the W-transaction is valid (or qualifying), in that the K-machine may make its decision based on not only the data from the W-transaction (its own W-chain or the rules in the applicable validator machine), but instead based on specific instances of data, as described by the set of W-blocks that make up the context or combined context. This may include data from multiple specific W-blocks from its own W-chain, other W-chains in its W-economy, and event potentially W-chains from other economies. Other types of machines (e.g., validators machines, evaluator machines, generator machines and/or the primary/interface machine) may also be considered context processors. The difference between those machines and a K-Machine is that the other machines perform a specific type of transform on the W-transaction. A K-Machine's function is more flexible, and may be used to define the functionality or use of a W-block as a store of transferrable value within the economy.

An economy controller may maintain and/or control an economy's W-assets and machines. In an embodiment, an economy controller may ensure, along with a recorder W-chain (the asset chain where a transaction is to be recorded), that the transaction is a W-transaction. The economy controller may then use the context attached to the W-transaction to retrieve the W-chain (or multiple W-chains if the context comprises W-blocks from different W-chains) associated with the W-block that was sent with the W-transaction as context, K. This may be the same W-chain as the recorder W-chain, or it may be a different W-chain.

An economy controller may select the lowest tier context W-chain among the selected context W-chain, and asks that W-chain's K-machine if it is willing to enable/approve the W-transaction such as, for example, by sending an ENABLE message to that W-chain's W-machine. Lower tier refers to older or more fundamental, with Tier 0 being a base level W-chain, as illustrated in FIG. 3. The K-machine may evaluate the combined context data from all the context W-chains and the W-transaction itself to make a decision about whether to approve the W-transaction. This decision may be based on, at least in part, one more rules that are programmed into the K-machine. Similarly, an economy controller may ask one or more context chains to enable a W-transaction, but only provides the combined context of W-blocks that are from the same or higher (e.g., less significant) tiers as the tier of that context chain.

This mechanism may enable multiple W-chains within the same W-economy (e.g., part of the same W-chain matrix), to interoperate and use each others' W-blocks and their associated contexts to make decisions about future W-transactions within the W-economy.

Similarly, this mechanism may also allow multiple W-economies to interact with each other and use each other's W-blocks for and to enable W-transactions. The ENABLE message, may be sent by the economy controller to the W-chain matrix of another W-economy (via a separate W-economy economy controller). If an ENABLE message travels past a trust boundary of an economy controller, it has to use at least the same level of security to ensure that these ENABLE messages to outside W-economies securely reach the outside W-economy economy controller, and that their response is also received securely.

As illustrated by FIGS. 1A and 1B, an economy controller associated with a W-Economy may receive 100 a request to record information in a W-chain maintained by the W-economy. An economy controller may be an electronic device or one or more programming instructions that, when executed, cause an electronic device to perform one or more actions. An economy controller may maintain and control the W-blocks and/or W-machines for an economy.

The request may include task data. Task data refers to data associated with one or more tasks that have been performed by one or more participants of a W-economy, and is represented in FIGS. 1A and 1B as $\theta_{raw}$. Task data may originate from a variety of different sources including, without limitation, from mobile devices, smart phones, computers, smart home or workplace devices or appliances, gaming devices, wearable devices (including without limitation health or fitness monitors), GPS navigation or signaling devices, timekeeping devices, short range communication devices (such as radio frequency identification (RFID) devices, near field communication (NFC) devices, quick response (QR) devices, Bluetooth-enabled devices), cameras, sound recorders, televisions, sensors, routers, mobile applications, computer applications, internet applications, databases, datasets, secure ledgers, blockchains and/or the like.

A request may also include context information, K, as described above. In an embodiment, a request may include an indication of the location where information is to be recorded. This indication may be an identifier or indication of a W-chain where one or more transactions are to be recorded.

As illustrated by FIGS. 1A and 1B, an economy controller may identify 102 a W-machine associated with the W-chain indicated in the request. FIGS. 1A and 1B illustrate an example W-chain matrix for a W-economy. The W-chain matrix interfaces to one or more W-machines for each W-chain in the W-economy. The economy controller may identify 102 the W-machine for the W-chain to which one or more transactions are to be recorded.

The economy controller may send 104 at least the task data and the context information from a request to the selected W-machine for the relevant W-chain. The W-machine may send 106 the task data and context information to a data router. A data router refers to an electronic device or one or more programming instructions that, when executed, cause an electronic device to perform one or more actions, such as routing information to one or more validator machines in the W-economy, as described above. As illustrated by FIGS. 1A and 1B, and as discussed in more detail above, validator machines may include U-machines (e.g., updates), R-machines (e.g., reassigns), X-machines (e.g., transfers) and S-machines (e.g., tasks). Additional and/or alternate validator machines may be used within the scope of this disclosure. A validator machine refers to an electronic device or one or more programming instructions that, when executed, cause an electronic device to perform one or more actions, such as determining if task data corresponds to one or more W-transactions (referred to in FIGS. 1A and 1B as $\theta$) that are suitable for recording in the indicated W-chain. A data router may decide which validator machine to send the task information and context information based on a data type associated with the task information.

In response to a validator machine determining that the task data is representative of one or more W-transactions for recording in the W-chain, a validator machine may generate a message comprising the one or more W-transactions and the context, and may sign 110 the message to generate a signed request, and may send 112 the signed request back to the economy controller.

After the request has been validated as described above, the economy controller may seek approval of the recordation. The economy controller may identify a W-machine to handle approval of the request. In an embodiment, the economy controller may identify a W-machine based on the context information in the request. The context information may identify a specific W-machine that is in charge of approving requests for the W-chain.

The economy controller may send 114 the signed request to the W-machine that is in charge of approving requests for the W-chain. This W-machine may send 116 the signed request to a data router, which may route 118 the signed request to a K-machine for approval. If the K-machine approves the request, the K-machine may also sign 120 the signed request to generate doubly-signed request. The K-machine may send 122 the doubly-signed request back to the economy controller.

Once the request has been validated and approved, the economy controller may send 124 the doubly-signed request to a W-machine associated with the W-chain identified in the request. The W-machine may send 126 the doubly-signed request to a data router, which may send 128 the doubly-signed request to a G-machine. A generation machine may generate new W-blocks for a W-chain.

In various embodiments, a G-machine may add 130 the W-transactions associated with the doubly-signed request to a W-pool. A W-pool may be a data store or other memory location. In an embodiment, a W-pool may store one or more W-transactions that have been received from record requests but that have not yet been recorded in a W-block of a W-chain.

A G-machine may analyze the W-pool (such as by using the Q-machine and E-machine for a W-chain as described above) to determine 132 if the conditions for generating a new W-block have been met. If so, the G-machine may ask the W-chain to create a new block using the W-transactions in the W-pool.

In an embodiment, a G-machine may determine whether a W-transaction of a transaction type exists. For instance, a G-machine may determine whether one or more completed tasks and/or transactions satisfy a definition of the qualifying transaction or whether a transaction in combination with at least a portion of previously identified transactions in the transaction pool satisfies the definition of one or more qualification transactions.

In an embodiment, a G-machine may determine whether a threshold level associated with the transaction type is satisfied by determining whether one or more qualifying transactions individually or collectively satisfy the threshold level associated with the transaction type. A threshold level refers to one or more threshold parameters associated with a transaction type. In an embodiment, a threshold level may be a numerical value, such as a certain number of qualifying transactions. In other embodiments, a threshold level may reflect a set of conditions that are to be met in order to generate a W-block, and may pertain to certain characteristics of a qualifying transaction or transaction type. In response to determining that the threshold level associated with the transaction type is satisfied, the G-machine may generate a W-block comprising data pertaining to the one or more qualifying transactions. The G-machine may add 134 a new block to the W-chain (W-block), where the new block includes the generated digital data asset.

In an embodiment, a W-block may include one or more qualifying transactions associated with the W-block. In an embodiment, a W-block may include a unique identifier associated with the W-block, and one or more secure references to a previous block/digital data asset in the W-chain. A W-block may include a list of transfer transactions that summarizes the transfer transactions involving a particular W-block. A transfer transaction assigns the shares of a W-block from the ownership of a G-machine that creates the W-block to a new owners. Subsequent transfer transactions may further change ownership from a current owner to a future owner.

Figure 4:
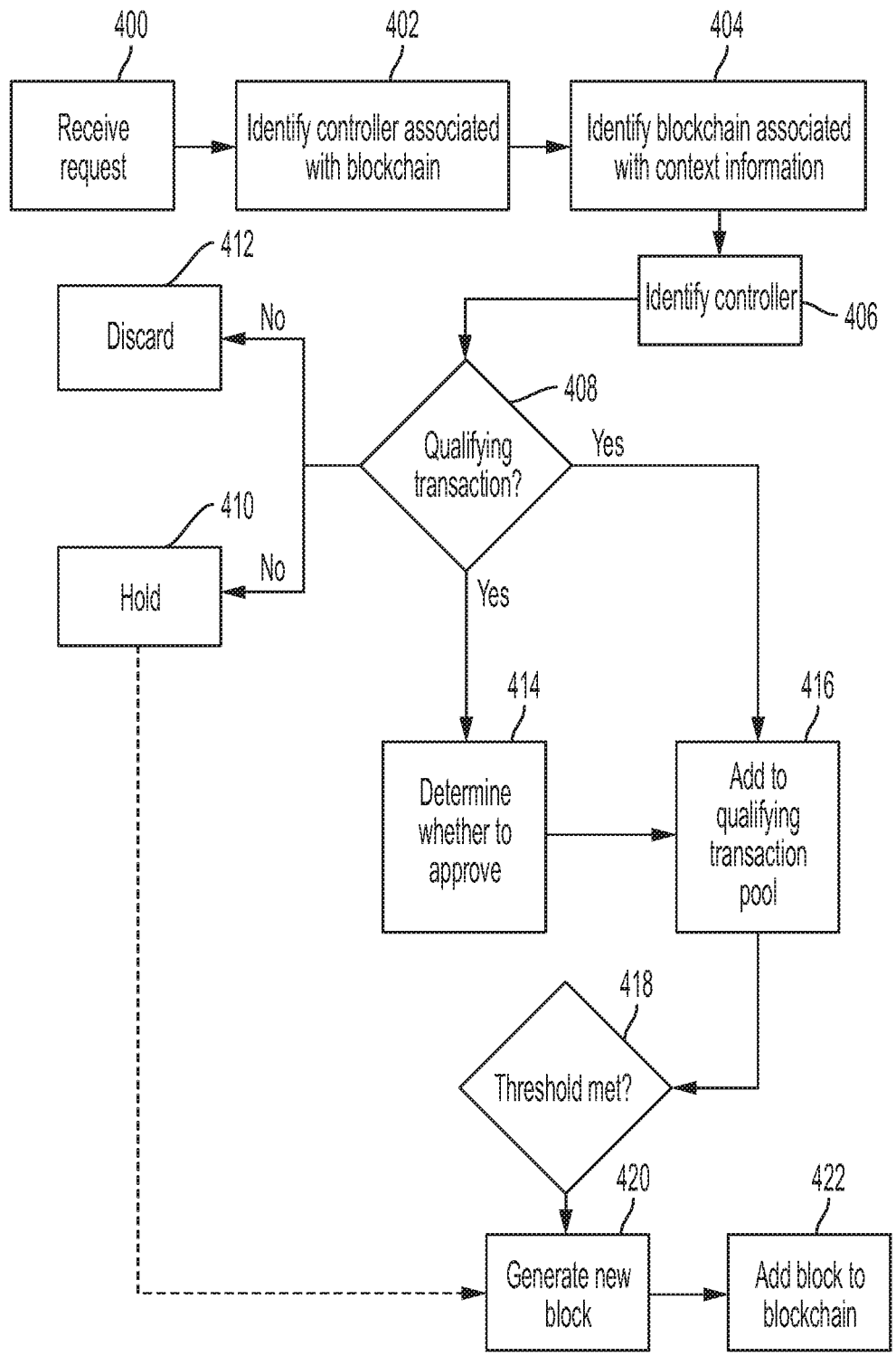
FIG. 4 illustrates an example flow diagram of a block generation process according to an embodiment.

FIG. 4 illustrates an example flow diagram of a block generation process according to an embodiment. As illustrated in FIG. 4, a request may be received 400 from one or more sources. The request may include task data associated with one or more tasks for an economy, context information, and/or an indication of a blockchain of a blockchain matrix to which the task data pertains. The task data may include a combination of participants, inputs and/or outcomes for a use case.

The system (e.g., an economy controller for an economy) may identify 402 a controller (e.g., a W-machine) that is associated with the indicated blockchain. The system may identify 404 a blockchain of the blockchain matrix that is associated with the context information, and the system may identify 406 a controller (e.g., a W-machine) that is associated with the blockchain to which the context information is associated. In various embodiments, the blockchain that is associated with the task data and the blockchain that is associated with the context information may be the same blockchain. In other embodiments, they may be different blockchains.

The system may determine 408 whether one or more tasks (as defined by at least a portion of the received task data) meet one or more requirements of a qualifying transaction. In various embodiments, this determination may be made by the identified W-machine (e.g., a validator machine associated with the indicated blockchain). As described in more detail in this disclosure, a qualifying transaction may be one that satisfies one or more rules, settings or other criteria specific to an economy.

For example, an economy may include one or more machines which may store one or more definitions of one or more completed tasks for the economy. A definition of a completed task may include one or more parameter values, settings, rules, values or other data which may be required or needed for that completed task to be considered to have occurred. The system may determine whether a task has been completed by determining whether at least a portion of the task data satisfies a definition of one or more completed tasks for the economy. The system may compare at least a portion of the task data to at least a portion of the stored definition for one or more completed tasks to determine whether the task data satisfies the definition.

In response to determining that a task has been completed, the system may determine whether a qualifying transaction of a transaction type exists. For example, the system may determine whether the task satisfies a definition of the qualifying transaction or whether the task in combination with at least a portion of previously identified tasks satisfies the definition of the qualification transaction. In various embodiments, the system may include one or more machines which may include one or more definitions, parameters or other values associated with a qualifying transaction for the economy. The system may compare the task to one or more qualifying transaction definitions to determine whether the task satisfies one or more definitions of a qualifying transaction for the economy.

If a validator machine determines that a task is not a qualifying transaction, the system may either hold 410 the task, but not place it into a transaction pool, or it may discard 412 the task. In various embodiments, held tasks or transactions may hold no utility weight (e.g., as determined by a Q-machine) for the qualifying transaction pool.

If the system determines that a task is a qualifying transaction, the system may determine 414 whether to approve recordation of the qualifying transaction into the qualifying transaction pool. In various embodiment, the controller associated with the context information may make this determination.

As part of this determination, the system may perform one or more validation reviews of the qualifying transaction before the qualifying transaction is added to the pool. For example, the system may perform one or more security reviews according to an embodiment. The security reviews may be run on one or more other transactions that have occurred since a last block was added to a relevant blockchain, one or more previous blocks of a blockchain, and/or an entirety of a blockchain according to an embodiment. A security review may be one or more programs or programming instructions that are executed by a validator machine to determine with a qualifying task and/or a qualifying transaction have occurred. A security review may be performed in addition to validating raw task data.

Once a qualifying transaction is validated, it may be added 416 to a qualifying transaction pool as described in more detail above. Alternatively, as illustrated in FIG. 4, a qualifying transaction may be added 416 to a qualifying pool without being validated.

Qualifying transactions may be collected in the qualifying pool until a threshold number or weight (as defined by a utility weigh determined by a Q-machine) of qualifying transactions is reached. In various embodiments, a G-machine may store a threshold number and/or a threshold weight. Once a G-machine determines 418 that a threshold number of qualifying transactions have been collected, the G-machine may generate 420 a new block that includes the qualifying transactions, as described in more detail above, and may add 422 the new block to the requested blockchain. For example, a G-machine may run a generation function to generate a new block. This may collect qualifying transactions and, optionally, non-qualifying transactions and secure them within a newly generated digital data asset/W-block. The W-block may include a transaction list, unique identifier, cryptographic reference, and/or additional context or metadata.

As described throughout this disclosure, the new block may be considered a digital data asset. In various embodiments, the new block may include the qualifying transaction data that caused generation of the digital data asset. Optionally, if non-qualifying transaction data is being held (step 410), at least a portion of such non-qualifying transaction data may be included in the new block upon its generation. The new block may be one similar to the W-block described above with respect to FIG. 2. For example, the new block may include a transaction list that includes information pertaining to the qualifying transactions from the qualifying transaction pool that caused the generation of the specific digital data asset and, optionally, non-qualifying transaction data. The new block may also include a unique identifier and a cryptographic reference to a previous digital data asset in the blockchain (assuming that the newly created block is not the first block of the blockchain).

Figure 6A:
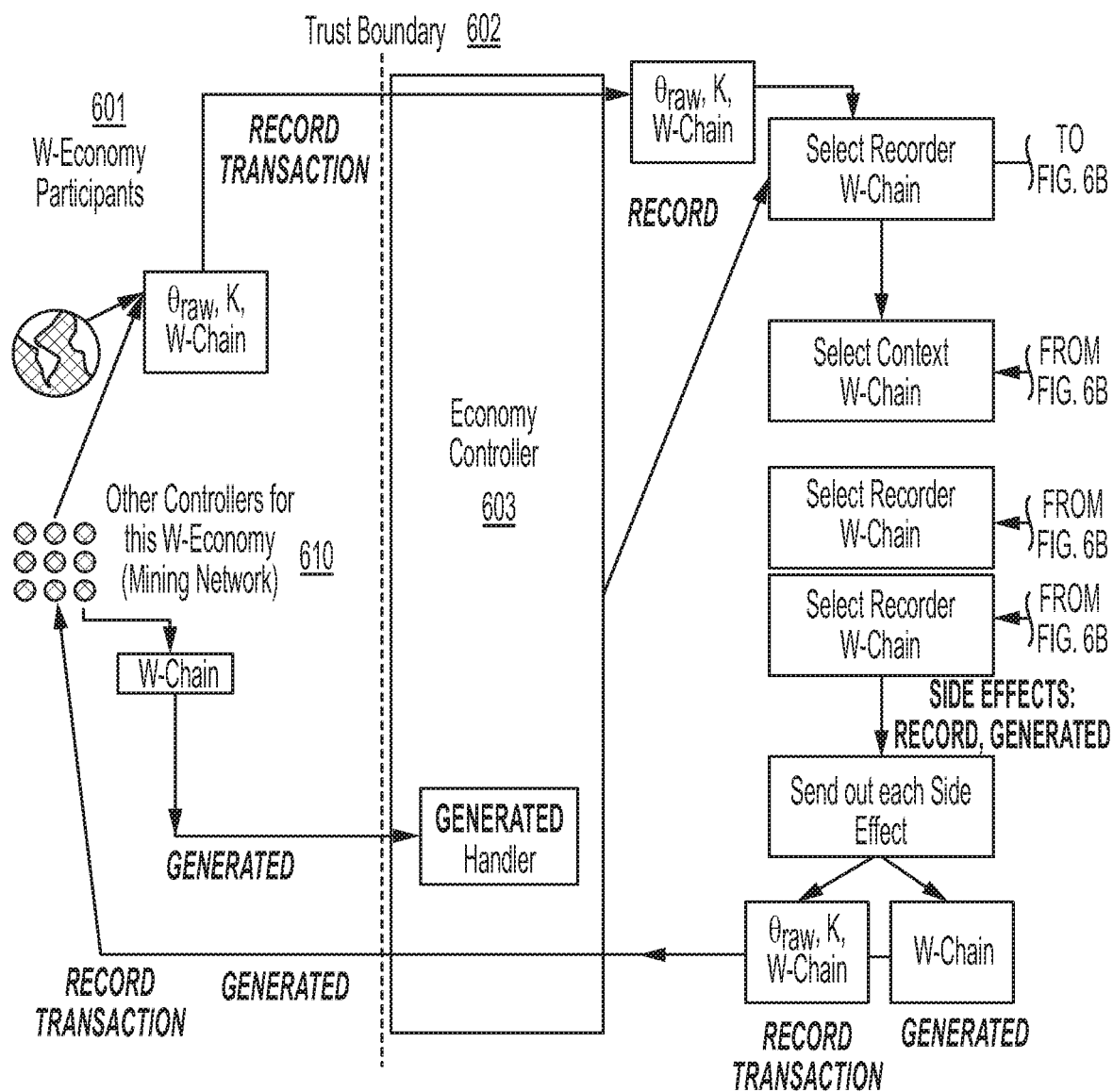
FIGS. 6A and 6B illustrate an example system for data flow within a data economy and the potential functionality of an economy controller according to an embodiment.
Figure 6B:
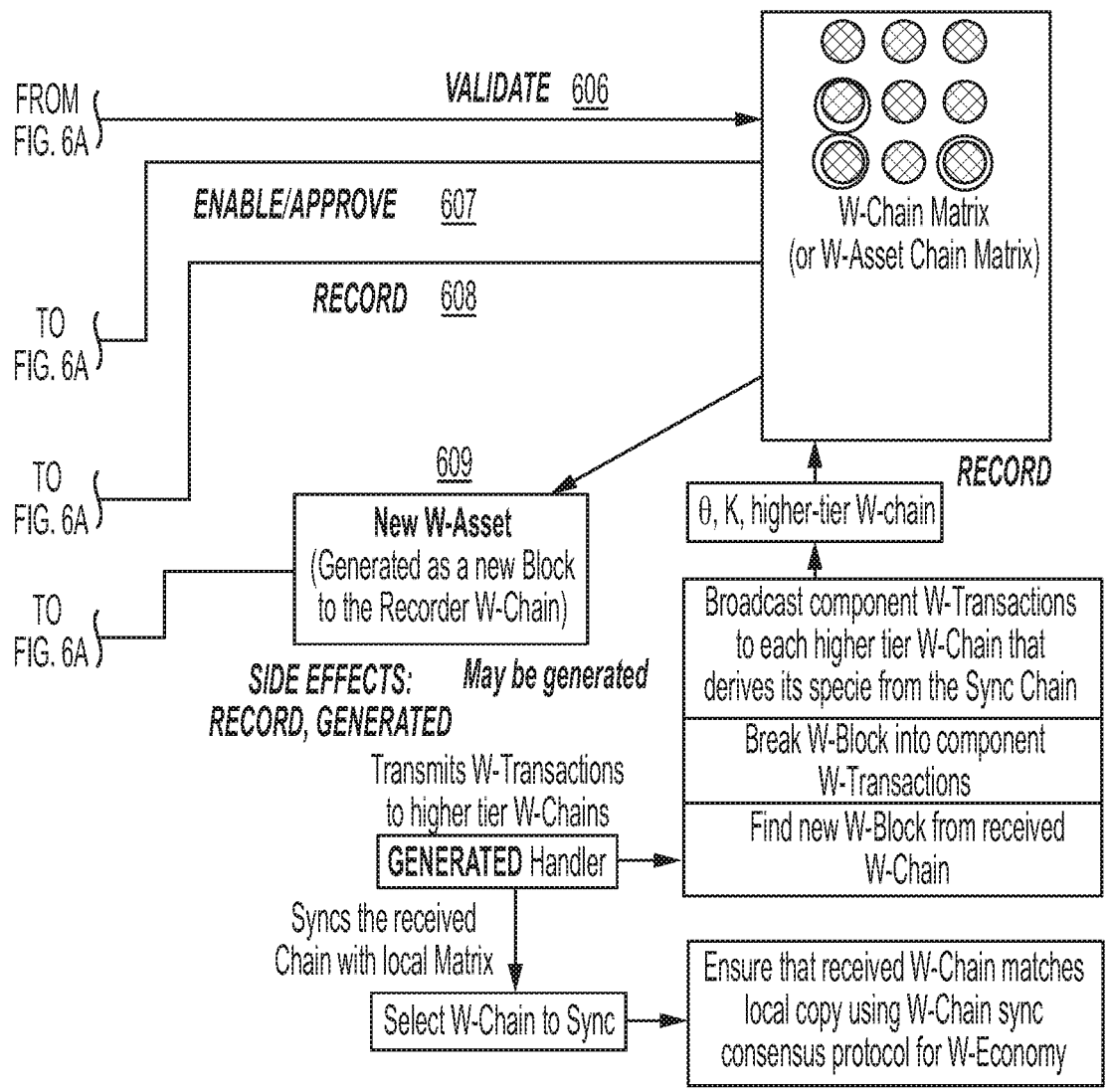

FIGS. 6A and 6B illustrate an example system for data flow within a data economy and the potential functionality of an economy controller according to an embodiment.

As illustrated in FIGS. 6A and 6B, W-Economy participants 601 may generate the tasks and task data ($\theta_{raw}$) that is passed to the economy controller 603 across the economy controller trust boundary 602.

The economy controller 603 may evaluate the $\theta_{raw}$, and decide whether that task data meets its requirements. If the economy controller determines that the $\theta_{raw}$ is relevant, it may route that $\theta_{raw}$ to the appropriate market machines for validation 606 as a qualifying transaction (theta).

Once a validator machine has approved the θraw as a qualifying transaction (theta) via the validation process 606, the qualifying transaction data may be passed by a context machine (Enable/Approve process) 607 to the appropriate context chain and the generation machine (Record process) 608 to the appropriate recorder chain.

In circumstances when the generation machine evaluates that the data present in the qualifying transaction pool satisfies the criteria for the creation of a new block, the generation machine may create a new W-block 609, otherwise the qualifying transaction data may be recorded to the pool.

The results of these record and generation functions may serve as input signals to tasks occurring in other data markets of the data economy. In this case, data may be passed via the economy controller 603 out of the trust boundary 602 to one or more other economy controllers of this data economy 610.

Likewise data from the other data markets of the economy may pass into the economy controller 603 of this data market when serving as an input function.

A generated handler (part of the economy controller 603) may analyze the asset contents and determines which higher tier W-chains require information. The generated handler may synchronize the block and makes sure it matches its own copy of the W-chain. The generated handler may read the theta transactions contained in the new block and may create a record request for each theta for each higher tier chain that the economy controller 603 determines was derived from this W-chain.

Figure 7A:
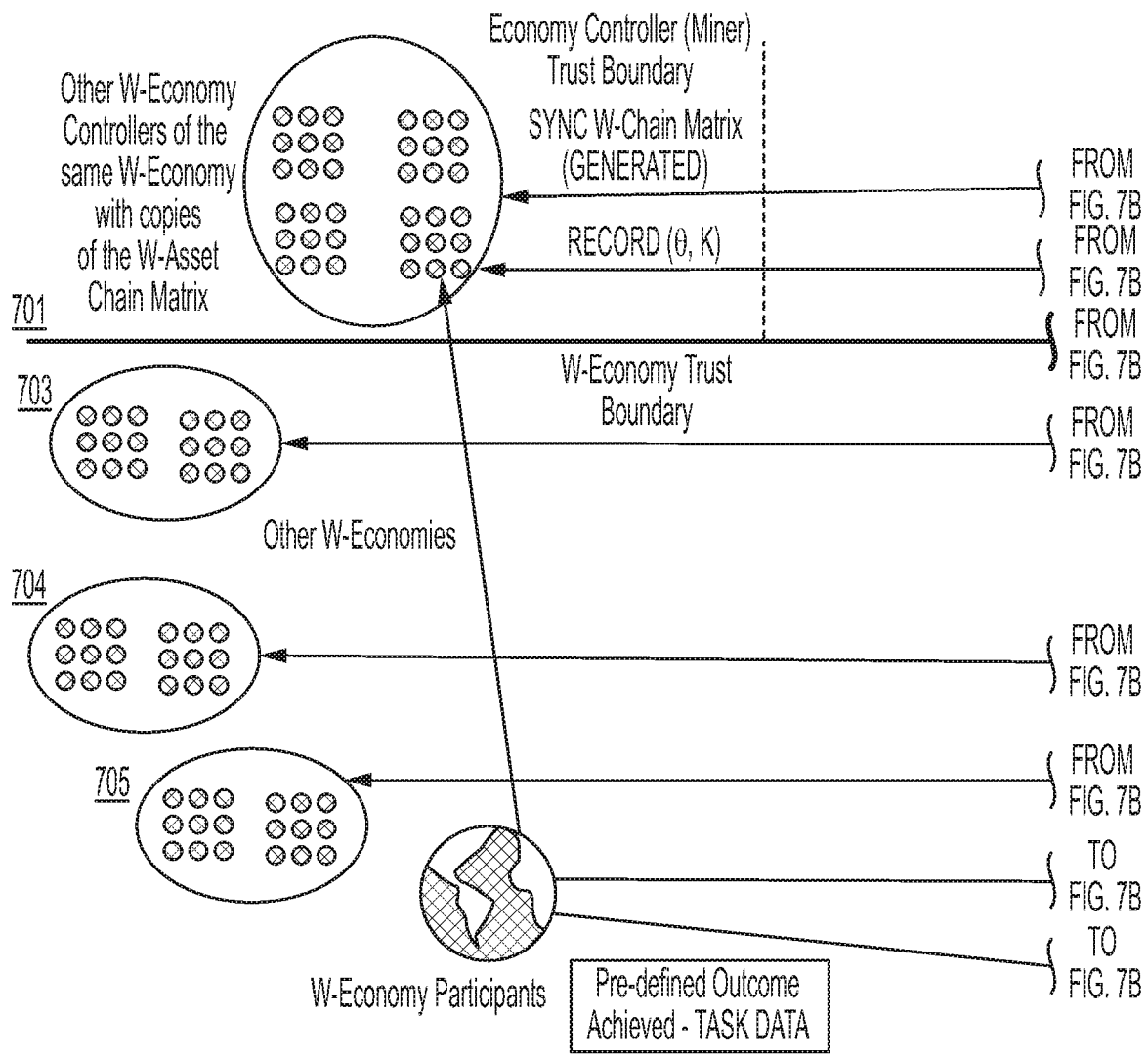
FIGS. 7A and 7B illustrate an example system for communicating across economies according to an embodiment.
Figure 7B:
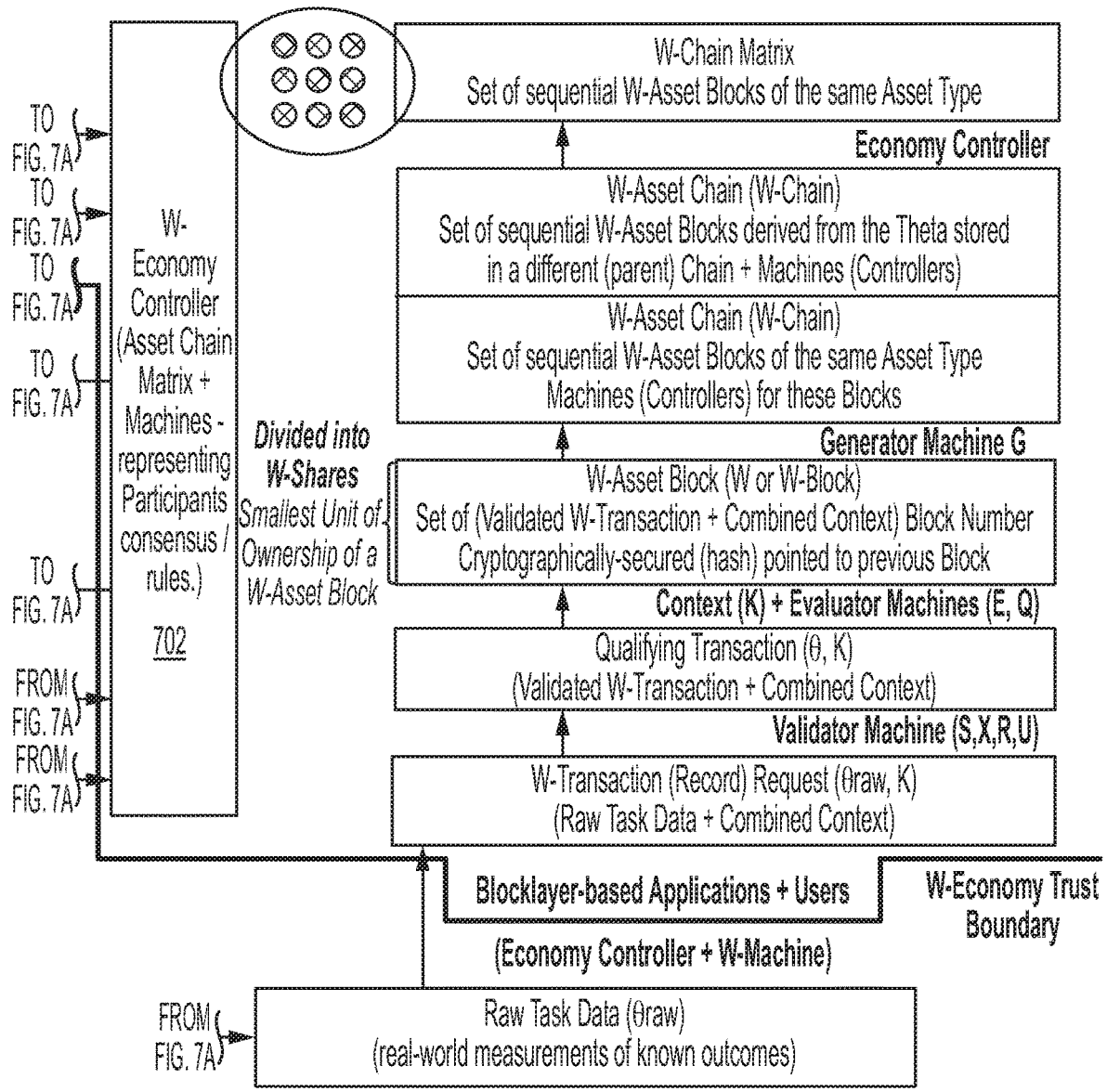

Referring to FIGS. 7A and 7B, an economy controller 702 may communicate with one or more economy controllers of one or more other data economies (e.g., 703, 704, 705). In an embodiment, an economy controller 702 may have one or more different protocols for communicating with the economy controllers within its own trust boundary as compared to those outside of the W-economy trust boundary 701. One or more of the economy controllers may use the context processor and evaluator machines to enable this functionality. There is no upward limit on the number of other economies that can communicate with each other via these protocols.

Example 1—Healthcare/Life Sciences Outcome-Based Arrangement

The following describes an example of the above-described system and methods that pertain to implementation of a data economy for a value based agreement, risk-sharing contract, outcomes-based contract, indication-based price, duration-of-therapy-based price, or simulation or analysis of any of the above innovative pricing, value pricing, or innovative and contracting methods for uses related to health care and life sciences, according to various embodiments.

In this example, the source of data may be Medicare claims or other health care data sets such as, for example: any health care claims (billing) data, longitudinal datasets of "real world data" describing health care interventions and/or outcomes, electronic health record (EHR) data, pharmacy benefit manager (PBM) or pharmacy datasets, or patient reported outcomes (PROs). A blockchain, designated W0, may store at least a portion of this source data.

In this example, participants may include individuals, patients, beneficiaries, health care delivery system entities, health care interventions or technologies such as drug or biologic agents, combinations or regimens of intervention, health insurers and managed care organizations, and/or manufacturers of health care products. Examples of health care delivery system entities may include, without limitation, hospitals, provider groups, providers and/or the like. Health care interventions may be identified by a specific billing code (e.g., HCPCS code or ICD procedural code), national drug code (NDC), electronic health record (EHR) or medication administration record (MAR) data, including, without limitation, drugs, biologics, radiation therapies, surgeries or procedures, diagnostics, imaging tests, genomic sequencing or biomarker tests, and/or the like.

An example of combinations or regimens of intervention may be a combination of chemotherapy drugs as evidenced by co-presence of HCSPCS J-Codes or NDS codes delivered in certain sequence, co-administered, or otherwise administered in a manner fitting a regimen or combination therapy per a standard such as FDA label, National Comprehensive Cancer Network (NCCN) Guidelines or similar clinical practice guidelines, or published medical literature. Combinations or regimens of intervention may also include drug and surgical intervention, diagnostic and drug, therapeutic intervention and supportive care intervention, and other combinations.

Health insurers and managed care organizations may include Medicare, Medicaid, other government payers, commercial/private health insurers, Pharmacy Benefit Management companies, and/or the like. Manufacturers may be, for example, manufacturers or products such as drugs, biologics, health devices or diagnostics.

In various embodiments, task data may include time parameters such as, for example, date of service, first and last billing code dates, dates between doses of a drug/biologic, dates between data points such as diagnostic data and intervention data, sequence of interventions, and/or the like. Qualifying tasks may include without limitation delivery of a specific intervention such as duration of therapy, survival, improved health status, or avoidance of negative health events that leads to the result of a specific health outcome, where an outcome may be defined by clinical or administrative parameters. Task data may include diagnostic data as evidenced by the presence of an ICD-9 or ICD-10 code in the data, test results including biomarkers, imaging, pathology, and genomic sequencing, patient-reported data, or the like.

In this example, outcomes may include, without limitation: (i) continued duration of therapy as evidenced by ongoing billing for intervention or regimen items (as evidenced by presence of billing codes), (ii) survival data or proxies for survival data, such as data indicating progression free survival (PFS) as evidenced by continued billing for any health service, EHR data, or longitudinal outcomes data, or proxies for disease free survival (DFS), as evidenced by lack of billing for a service related to a particular disease diagnosis, the specific and defined health outcomes (as evidenced by billing for other services, outcomes described in EHR, or other); and/or (iii) patient reported outcome (PRO) data including quality of life (QOL) data derived from patient questionnaires, patient-facing apps, wearables and/or the like. Administrative outcomes may include duration of treatment, duration of therapy, cost of care, cost of drug prescribed, or quality measure score.

In an embodiment, a W-chain (designated W0 may describe a risk sharing agreement based on duration of therapy for a particular intervention (e.g., drug/biologic) within a certain regimen. A W-asset may be created based on duration of therapy (e.g., number of instances over time) of specific drugs used within specific regimens for specific patient/beneficiaries (e.g., using data stored in the $W_0$ chain).

Participants (e.g., intervention manufacturer/payer) may have defined thresholds for duration of therapy and financial incentives/disincentives such as, for example, discounts and/or bonuses, that are payable based on duration on a per-patient/beneficiary basis (or optionally, a population level basis). In some embodiments, the agreement may be programmed into one or more W-machines associated with the W1 chain.

In an embodiment of a value based agreement data economy, a W-chain (designated $W_1$) may describe a risk sharing agreement between a pharmaceutical manufacturer of Drug A and an insurance company, pharmacy benefit manager, or other payer or financially responsible party based on total cost of care differentials between two defined cohorts of patients—Cohort A that is prescribed Drug A and Cohort B that is prescribed Drug B. A W-asset may be created based on the differential between an average total cost of care for a defined period of time for patients in a defined Cohort A and an average total cost of care for a defined period of time for patients in a defined Cohort B. A W-chain (designated $W_2$) may describe the financial results of such an agreement as contained in W 1, where a discount is applied to the price of Drug A when the total cost of care differential as calculated by and contained in W1 exceeds a predefined threshold.

In certain embodiments, the assignment of digital data assets at generation or at transfer of such assets may allow for the accrual value in the form of digital data assets or shares of such assets to the manufacturer or payer to represent the financial liabilities/assets associated with the performance of the agreement. Additional data may come from a record of financial transactions—manufacturer and payer contributing to escrow account to cover "payouts" at contract-defined intervals.

In an embodiment, an E-machine for a W-chain associated with a risk-sharing instrument asset may represent pricing data for a health care intervention (i.e. drug, biologic, device), service, diagnostic, or similar that may have geographic and time bounds, such as manufacturer list price for a device, Average Sales Price (ASP) as published by the Center for Medicare and Medicaid Services, Average Wholesale Price (AWP), Wholesale Acquisition Cost (WAC), hospital charge-master price.

In an embodiment, a Q-machine for a W-chain associated with a risk-sharing instrument asset may assign variable utility to qualifying transactions so that qualifying transactions resulting in more highly valued outcomes for the W-economy (such as a longer duration of therapy, improved survival, or improved quality of life) are associated with a higher Q value (utility weight) and thus have a proportional higher contribution to the generation of new W-assets for the specified W-chain.

In an embodiment, a context associated with this example may be the presence of financial transactions indicating manufacturer/payer are paying into designated escrow account ($W_1$ level). As another example, a context may be that the contract is still "live" and has not expired per contract terms (e.g., time or number of patients guaranteed to start a particular therapy ($W_1$ level).

Example 2—Shared Savings Agreements

The following describes an example of the above-described system and methods that pertain to implementation of a system of accounting and adjudication for shared savings agreements among multiple participants in a health care market according to an embodiment.

In this example, the source of data may be a health care data set such as, for example: any health care claims (billing) data, longitudinal datasets of "real world data" describing health care interventions and/or outcomes, electronic health record (EHR) data, pharmacy benefit manager (PBM) or pharmacy datasets, patient reported outcomes (PROs), or participant data including data from wearable devices, monitors, or software applications. A W-chain, designated $W_0$, may store at least a portion of this source data.

In this example, participants may include individuals, patients, beneficiaries, health care delivery system entities, health care interventions, combinations or regimens of intervention, health insurers and managed care organizations, and/or manufacturers of health care products. Examples of health care delivery system entities may include hospitals, provider groups, providers and/or the like. Health care interventions may be identified by a specific billing code (e.g., HCPCS code or ICD procedural code), NDC, EHR or MAR data such as, for example, drugs, biologics, radiation therapies, surgeries or procedures, diagnostics, imaging tests, genomic sequencing or biomarker tests, and/or the like. Health care interventions may also be identified by an individual's use of a monitoring device, including, for example, a wearable device.

Health insurers and managed care organizations may include Medicare, Medicaid, other government payers, commercial/private health insurers, Pharmacy Benefit Management companies, and/or the like. Manufacturers may be, for example, manufacturers of products such as drugs, biologics, health devices, or diagnostics.

In various embodiments, task data may include time parameters such as date of health care service, billing code dates, time elapsing between first use of an intervention and a specified outcome, sequence of interventions, or time elapsing since the start of an intervention and the current time. Task data may include diagnostic data as evidenced by the presence of an ICD-9 or ICD-10 code in the data, test results including biomarkers, imaging, pathology, and genomic sequencing, patient-reported data, data from wearables or monitoring devices, or the like. An example of a qualifying task and outcome may be the patient utilization of a wearable diabetes monitor over time to result in improved management of diabetes and/or reduction in utilization of emergency department and other health services secondary to a diabetes diagnosis.

In this example, outcomes may include, for example:
Frequency of health care product and service utilization and/or consumption, as evidenced by billing codes presented to an insurer or payer or other types of invoices for health care products and services;

Measures describing "total cost of care" for a defined episode of care, a defined diagnosis, or a defined time period as evidenced by billing codes or invoices for health care products and services, or proxy measures for total cost including estimated or predicted costs for an individual or a cohort of individuals;

Survival data, or proxies for survival data, including proxies for progression free survival (PFS) as evidenced by continued billing for any health service, EHR data, or longitudinal outcomes data, or proxies for disease free survival (DFS) as evidenced by lack of billing for a service related to a particular disease diagnosis;

Other specific and defined health outcomes (as evidenced by billing for other services, outcomes described in EHR, or other);

Health care provider performance metrics related to defined quality measures, such as quality measures defined by National Quality Forum (NQF) or other national or international health care organizations, or by health care professional societies, or by insurers and payers such as the Centers for Medicare and Medicaid Services (CMS);

Patient reported outcome (PRO) data including quality of life (QOL) data derived from patient questionnaires, patient-facing apps, wearables, and/or the like;

Clinical outcome data including data derived from monitoring devices, diagnostic tests, or electronic health records (EHRs);

Engagement metrics such as frequency and duration of patient interaction with a monitoring device, wearable device, software program, clinical or social support program (e.g. telephone or video consultation or intervention with a care provider or peer support group), robotic device, education module, or other interactive tool(s).

In an embodiment, a W-chain (designated $W_1$) may describe a shared savings agreement based on the accrual and/or distribution of financial or other reward to participants proportional to the inputs contributed and utility derived from those inputs within a health care setting. An example may be the utilization of a wearable monitor and device for diabetic patients, where the manufacturer of such device creates an agreement with an insurer or managed care company to share in any savings in total health care costs or in expense and utilization of specific health care products and services (e.g., emergency department visits and hospital admissions) resulting from patient utilization of such a device compared to: (1) a similarly matched cohort of patients who are not using the device; (2) past utilization of products and services by the same cohort or a similarly matched cohort of patients prior to use of the device; or (3) a financial model prediction of expenditures and costs associated with the cohort now utilizing such a device. Such a shared savings contract may also include additional participants such as patients, individuals, health care delivery systems, health care providers, and manufacturers of diagnostics, drugs, and biologics. A W-asset may be created based on the utilization of health care products and services for specific individuals, patients, device users, or beneficiaries (e.g., using data stored in the $W_0$ chain).

Participants (e.g. device manufacturer/payer/drug manufacturer/provider) may have defined parameters or targets for reduction of health care products and services utilization, defined targets for disease monitoring or management, or defined targets for health outcomes that have specific financial incentives or disincentives attached. In some embodiments, the agreement may be programmed into one or more W-machines associated with the $W_1$ chain.

Participants (e.g. device manufacturer/payer/drug manufacturer/provider) may define and assign proportions of savings to specific tasks and outcomes dependent on participant actions, participant inputs, and desirability of outcomes.

In an embodiment, an E-machine for a W-chain associated with a shared savings agreement may represent pricing data for a health care intervention (i.e. drug, biologic, device), service, diagnostic, or similar that may have geographic and time bounds, such as manufacturer list price for a device, Average Sales Price (ASP) as published by the Center for Medicare and Medicaid Services, Average Wholesale Price (AWP), Wholesale Acquisition Cost (WAC), hospital charge-master price.

In an embodiment, an E-machine for a W-chain associated with a shared savings agreement may represent time and effort on behalf of an individual to complete a task such as, for example: engagement with a device, program, or tool; self-monitoring according to a defined schedule; reporting patient reported outcome data according to a defined schedule; utilization of a wearable device or monitoring system; or completion of a health or wellness intervention or task.

In an embodiment, an E-machine for a W-chain associated with a shared savings agreement may represent a level of investment by a manufacturer, payer, provider, or other participant in the development of a program, device, intervention, or tool used in the prevention, diagnosis, management, monitoring, or treatment of a disease.

A Q-machine for a W-chain associated with a shared savings agreement asset may assign variable utility weights to qualifying transactions so that qualifying transactions resulting in more highly valued outcomes for the W-economy (such as reduced consumption of specified health care interventions including emergency department visits) are associated with a higher Q— value (utility weight) and thus have a proportional higher contribution to the generation of new W-assets for the specified W-chain.

In an embodiment, a Q-machine for a W-chain associated with a shared savings agreement may assign utility to qualifying transactions based on predicted value of such transaction to the W-economy. Predicted value may be derived from existing health care datasets and agreed upon by the participants.

A context associated with this example may be the presence of financial transactions indicating manufacturer/payer are paying into designated escrow account ($W_1$ level). As another example, a context may be that the shared savings agreement is still "live" and has not expired per contract terms (e.g., time or number of patients guaranteed to utilize or engage with a device with a specified duration and frequency ($W_1$ level). As another example, a context may be that the total savings when compared to the control cohort must exceed a specified financial or numerical threshold prior to the allocation or distribution of newly generated or transferred $W_1$ level W-assets.

Example 3—Investment Data Economy for a Production Firm

The following describes an example of the above-described system and methods pertaining to the implementation of an Investment Data Economy for a firm that produces a good, the production of which requires optimizing the manufacturing process as well as the marketability of a product through data-driven insights according to an embodiment.

In this example, the source of data may be measurements of the efficiency of the manufacturing process, product testing in a demo environment, and/or feedback received from those consuming the product. Participants may include the firm, the product testers, and/or the end-users of the product.

Task data may include observed changes in the material effectiveness of a process or product immediately following an observed and measured change in the product or process. There is no connotation to these changes, at this point the changes have simply been observed.

Qualifying tasks may include, without limitation, one or more observed positive effects of implementing a change. In an embodiment, a task is not "qualifying" until the change is deemed valuable to the firm. This may refer to the measured observation of productive process that was adjusted to waste fewer raw materials, and thus increase the yield of that process. Or the measured observation of a product's marketability being improved as a result of changes made to the product based on user feedback.

In this example, outcomes may include measurable financial impacts derived from insights generated by observing how a process or product was improved by a change to the process or product. This could include, for example, the firm being able to sell those insights to another firm who may find it valuable, or the firm being able to borrow against the financial impact as a lender has recognized the value and is willing to provide the firm liquidity with the asset being held as collateral (in the form of an Investment Data Asset.

In this example, a W-chain may describe the process of collecting measurement data, analyzing the data, deriving insights from that analysis, measuring the change to a product or process of implementing those insights, and finally the financial impact of those changes.

A W-asset may be created based on an observation that a collection of task data has been deemed valuable to the firm and is thus qualifying. In an embodiment, a Q-machine for a W-chain may evaluate the utility of the qualifying task. A firm that produces a similar product may give a high utility to the example firm's qualifying task, as would a lender who knew that there was a market for that qualifying task. A firm in another industry may give it a low utility.

Example 4—Industrial Compliance and Recycling

The following describes an example of the above-described system and methods pertaining to implementation of a process for industrial compliance and recycling according to an embodiment. A specific instance of this example may be the recycling of lead acid batteries, and a system to track and encourage the delivery of used batteries to authorized or compliant (regulatory and environmental) lead acid battery recyclers by capturing used battery data at two or more different points in the battery supply chain, sale, return, and recycling process. This data may be recorded as data assets on at least two separate w-chains. This example may further incorporate a Data Economy that represents a financial component, such as a rebate or a coupon that is generated when data demonstrates that a battery has been recycled in a compliant manner.

The source of data in this example may be battery serial numbers or other unique identifiers, including, without limitation, unique identifiers established by a bar code, Quick Response (QR) code, or photographs of such unique identifiers where the unique identifier can be extracted via machine learning or computer vision from a digital photograph. Alternatively, the unique identifier may be entered into a mobile app or conveyed via mobile messaging (e.g., short message service (SMS) or instant messaging (IM)) as text or as a photograph. Sources of data may include identifiers for various participants such as consumers, scrap metal dealers, recycling facilities, or battery retailers, and including potential data parameters gathered from a mobile device such as a timestamp and/or geotag via a mobile device's GPS or location measurement system.

Participants may include dealers or retailers, end-consumers, scrap metal or battery dealers, collectors, or gatherers, and/or the people or entities performing recycling or recycling-related tasks. Participants may also include financial sponsors and financial beneficiaries of such a program, including battery manufacturers, recyclers, governments or governmental agencies, investors, consumers, or third-party sponsors.

Task data may include information pertaining to when a battery is purchased at a retailer by an end consumer, when the end consumer (or another entity such as a scrap metal gatherer) drops off the battery at a dealer or when a dealer (or another entity such as a scrap metal gatherer) drops off the battery at a compliant recycler, and/or the like.

Qualifying tasks may include without limitation, when battery data is entered in at various steps by any of the data economy participants, when a battery enters or leaves a dealer shop, and/or when a battery arrives at the recycling facility.

Outcomes may include the designation that a specific battery that was sold, as evidenced by the collected data, has completed all of the steps and been turned into the recycling location to create a closed loop. An outcome may also include a designation that a financial incentive (rebate, coupon, tax credit) has been used and recorded, and is no longer available for use.

In this example, a blockchain may include information pertaining to one or more batteries that have gone through a compliant recycling process or batteries that have gone missing after being dropped off at a dealer—presumably sold to an unauthorized recycler. A W-chain may also describe the differential (delta) between batteries that are expected to be recycled based on batteries that have been previously sold and batteries that have been confirmed to be recycled. W-chains may also represent the available and spent financial incentives (rebates, coupons, tax credits) based on the completion of recycling tasks and the generation of recycling outcomes as evidenced in the other W-chains in the data market.

A W-asset may be created based on the completion of tasks to indicate that a battery that has been sold has been accepted at a compliant recycling facility. A different W-asset may be created based on the "loss" of a battery to follow-up data when that battery has not been accepted at a compliant recycling facility within a predetermined period of time. A different W-asset may be created to represent a financial incentive linked to the W-asset indicating a successful acceptance of a battery at a compliant recycling facility. A different W-asset may be created based on when the financial incentive W-asset is used or expired.

In an embodiment, an E-machine for a W-chain may represent the cost of data collection of the battery identifier and other relevant information via a mobile app or mobile messaging service. An E-machine for a W-chain may also represent the cost of battery manufacturing or the expected cost of failure to recycle a battery in a compliant fashion.

A Q-machine for a W-chain may evaluate the various tasks associated with the completion of compliant battery recycling, and may assess various tasks at various utility weights, for example weighing the final task of the battery being accepted at a compliant recycling location as representing the majority of the utility of this transaction set and the initial task of the battery being sold as having much less utility in the evaluation of whether the battery is appropriately recycled. However, for another W-chain that primarily represents the batteries sold that are expected to eventually be recycled, a Q-machine may assign high utility to the transaction representing the initial sale of the battery.

In an embodiment, a context associated with this example may include information pertaining to where and when a battery was purchased or recycled, or information about the people who completed the process in the case that they would be offered a reward or rebate for completing the process. Context may include information that allows participants who may currently work in informal roles such as gathering of scrap metal across many different jurisdictions or types to collate their participation in multiple W-chains and demonstrate the value of such informal labor to the outcomes of a larger recycling market (value across different Data Economies).

Example 5—Immersive Game

The following describes an example of the above-described system and methods pertaining to implementations of an immersive, augmented, or virtual reality game that aims to connect a fictional world and associated digital rewards with the work done by players in the real world and thus real-world currency, digital currency, or other digital or physical assets of value according to various embodiments, In this example, the source of data may be derived via an electronic device, such as a computer or mobile device, gathering information about aspects of the game environment from the players, as well as from inputs such as a GPS or other location measurement service, inputs from timing devices (clock) hardware in the mobile, digital or computer device, information entered into a mobile application or computer application specific to the game by a human or machine player, information input into a mobile application or computer application specific to other games or companies that interfaces with the gaming software by a human or machine player, other information collected by other sensors of an electronic device or related to the game and/or the like. In various embodiment, this data may represent digital data assets, one or more agents (such as, for example human or machine players of the game who work for a certain company within the game), and/or persistent virtual buildings (e.g., factories, research labs or headquarters) that are owned by an agent. Persistent virtual buildings may be associated with real-world locations via GPS or other location data.

Participants may include human or machine players or "agents" in the game, game masters or management, and/or external companies who present real-world tasks to be converted to in-game quests. Task data may include, without limitation, physical location data, digital data assets collected or shared by players, code created by players, or specific real-world work tasks as determined by game masters or management or by external companies who present real-world tasks to be represented as in-game quests.

Qualifying tasks may include, without limitation, the completion of any real-world task that is defined using data types available in the system and is determined by the game masters or a third-party company sponsor via the game masters. Examples may include geomapping (e.g., a company needs topographical data of a previously uncharted, forested region near Los Angeles in order to plan a low-cost housing community for veterans), incentive for rideshare drivers to drive longer hours, to drive in an underserved area, or to drive at a peak busy time when ride demand is higher; incentive for the coding and development of a Node.js module written for a third party company's website that allows the company to publish articles to a social media platform directly from their content management system.

Outcomes may include the adequate completion of any of the qualifying tasks as determined and predefined by the game masters. Examples include, without limitation, activities that generate digital data asset(s) as defined by the game masters, the generation of topographical data, the completion of additional ride share driving hours, or the development of computer code for a third party company, and/or the like.

A W-chain may include information that describes one or more actions or quests completed by a player, information about all of the players associated with a single narrative path, data collected or created by players, and/or the like. A W-asset may be created based on one or more generating activities completed by one or more players or agents.

An E-machine may represent the cost a company pays to have their real-world task converted to an in-game quest and run on the platform, the cost for performing the task for players or management, and/or the like.

A Q-machine may assign utility to qualifying transactions based on predicted value of such transaction to the W-economy. Predicted value may be derived from existing datasets and agreed upon by the participants.

A context associated with this example may include information pertaining to how long a player has been participating, which of the teams a player is associated with, a player's past narrative choices and experiences, and/or the like.

Example 6—Electricity Flow

The following describes an example of the above-described system and methods pertaining to implementations designed to model the components of and flow of electricity within an electric grid. This modeling may be illustrate such components and/or flow as a graph (or matrix) of interconnected blockchain-backed data assets, together forming an instance of an Electric Grid Data Economy (an EGDE). The EGDE may be designed to track the production and utilization of energy/power within a grid (or a subset of a grid), as well as the overall performance of the grid that it represents.

The source of data may be a specific type of performance within the electric grid, created, managed, and/or utilized using rules determined by the participants in the data economy. Participants may include, without limitation, electricity suppliers, utility companies, consumers, entities who own and maintain distribution lines, regional transmission organizations, power plants, transmission lines, transformers, distribution lines, smart grid systems, equipment manufacturers, equipment service personnel, balancing authorities, and/or the like.

Task data may include information that represents the net loss of power over an area of a grid or between specific transformers can carry the data that represents the power transmitted by the first transformer and the power received by the second transformer. Such information can be evaluated to find the net loss of energy between the transformers, using real-world data whose meaning and source are understood and trusted by all parties involved in the EDGE (e.g., utility companies, industrial customers, individual families, equipment manufacturers, etc.). As another example, this information may represent that a critical piece of equipment went a certain period of time (e.g., 24 hours) without any issues, can carry data proving the availability of the equipment within it.

In an embodiment, qualifying tasks may include measurement of energy transmission performance of any part of the electric grid, utilization of certain grid elements, production of a set amount of energy, various measures of performance (or lack thereof) within the grid, and/or the like.

In this example, outcomes may include, for example: (1) being able to track, audit, and optimize the transmission and distribution of electricity across the grid at a much more granular level than with just the traditional RTU (remote terminal unit)/SCADA (Supervisory Control and Data Acquisition) Master architecture, while being fully compatible with DNP3 (Distributed Network Protocol, a communications protocol commonly used for electric utilities) and/or other protocols that run applications and devices on the grid; (2) being able to utilize digital data assets created to provide incentives to the various participants in the grid (consumers, generators, other service providers, for example); and/or (3) being able to automate the process of automating decisions requiring the aggregation of data from several different entities (such as substations, specific nodes etc.) and to generating consensus among these entities.

In an embodiment, a W-chain may represent a number of times a piece of equipment performs up to a certain standard, times when the grid operates in a predefined efficient manner, energy consumption for a specific consumer or building, a frequency of peak-demand instances for a certain geographic area, and/or the like.

A W-asset may be created based on one or many measurable units of generated energy, one or many measurable units of energy consumed, one or many measurable units of energy transmitted or distributed, predicted demand for measurable units of energy, demonstrated demand for measurable units of energy, the delta between predicted demand of units of energy and consumed units of energy, the units of energy generated compared to the units of energy distributed or consumed, and/or the like.

An E-machine may represent a cost for a unit of energy, or the amount of savings gained by limiting performance at peak-demand times. A context may include information about weather patterns that affect energy consumption and demand, consumer data regarding location and building type or size, and/or the like.

Example 7—Investment Data Asset Platform

The following describes an example of the above-described system and methods that pertain to the implementation of a data economy that creates, manages, and facilitates the trade of digital data assets that can serve as financial instruments of investment.

This example contains two component implementation data markets, together making an Investment Data Economy (IDE). The first data market governs the creation and management a data asset of the type Investment Data Asset (IDA), which is a financial instrument that can be used to accept investment capital for a firm or corporate entity. The second data market (Performance or Income Data Economy) governs the creation of Income or Performance Data Assets (INA or PDA) based on real world performance of the company and/or its products, and communicates with the IDA data market.

An IDA (more specifically the programs (machines) making up the IDA Data Market) contain rules to grant owners of IDAs (representing investment in a firm), the ownership of INAs, which represent value generated by the firm such as equity or a promise of future cash flow, potentially in the form of a revenue share, royalty, or debt obligation.

The IDA Data Market (programs/machines making up the data market) also has the ability to trade IDAs directly with capital markets in exchange for financial instruments, gains and losses via programs and protocols in the Economy Controller of the IDA Data Economy.

In this example, the source of data may be, for example, financial and production metrics held within a firm or corporate entity, such as total revenue, product-specific revenue, product-specific revenue in a specific market or geography, production efficiency metrics, customer acquisition metrics, growth metrics, or other performance metrics. Other data sources may include share price or trading volume.

In this example, participants may include, without limitation, the corporate entity or firm, that firm's products, customers, investors, regulators, and/or traders.

In various embodiments, task data may include product sales, product revenues, product market entry, corporate milestones achieved, corporate earnings, an amount of currency invested, or a trade order or request, equity in the company, and numerous others.

Qualifying tasks may include, without limitation, (for the IDA Data Market) the investment of funds generating a specific Investment Data Asset as evidenced by a financial transfer, (for the Performance or Income Data Economy) the accrual of product-specific revenue to a company's income statement or the vesting of a portion of the company's common stock into an Income Asset (Equity Income Data Asset), or (for the IDA Platform Data Economy) the entry of a trade order for an Investment Data Asset.

In this example, outcomes may include financial thresholds met for investment levels (IDA Data Market), financial thresholds met for revenue levels (Performance Data Economy), the time-based triggering of the release of a portion of the entity's stock into Equity Income Data Assets (through the Income Asset Data Market), or the fulfillment of an order to buy, sell, or trade (IDA Data Market).

In an embodiment, a blockchain may describe Investment Data Asset Chain (containing the programs describing the Investment Data Asset Market): A W0 level w-chain may describe an unfulfilled claim on future product-specific revenue (such as a royalty or a revenue share) where a W-asset representing each unit of unfulfilled claim could be created when a certain level of investment representing the price of the Investment Data Asset is made in the Investment Data Asset.

This W0 level w-chain may describe transactions among various IDA Data Economies, including the purchase, trade, exchange, and sale of IDA Data Assets using currencies, cryptocurrencies, or IDAs. A W-asset may be created based on a number or currency amount equivalent of trades.

Performance Income Data Asset Market: A W0 level w-chain may describe the accrued product-specific revenue to which there may be an associated royalty or revenue share, but does not describe the royalty or revenue share itself. A W-asset could be created each time a certain level of revenue (for example a prespecified dollar amount) is generated by the product.

IDA and Performance Data Asset Chain (containing programs describing the Income Data Asset Market): A W1 level w-chain may describe the royalty or revenue share that will fulfill the conditions of the IDA Data Economy and be contributed by the revenue represented in the Performance Data Asset Economy. A W-asset may be created on a time basis, or as increments of revenue accrue, representing the percentage or part of the product-specific revenue represented by the Performance Data Asset Economy that will be used to fulfill the claim on such revenue as represented by the IDA Data Economy.

In an embodiment, an E-machine for a W-chain for an IDA Data Market may represent, without limitation, the transaction costs or transaction fees associated with a company establishing an Investment Data Asset. In another example for an IDA Data Market, an E-machine may represent the transaction fees associated with trading IDAs or exchanging IDAs for other assets that could include Data Assets or other representations of value. As an example, an E-machine for a Performance Data Market may represent, without limitation, the cost of goods sold related to the product-specific revenue accrued.

In an embodiment, a Q-machine for a W-chain associated with an IDA Data Market may represent, without limitation, the market value of the IDA, the future projected value of the IDA, the relative value of a subset of IDAs to a larger set of IDAs, or similar markers of the utility of the IDA to the IDA Data Market. A Q-machine for a W-chain associated with an INA or PDA Data Market may represent, without limitation, the market value of the produced goods, the price of the produced goods, or similar markers of the utility of the produced goods, services, or income relative to the INA or PDA Data Market.

In an embodiment, a context associated with this example may be, without limitation, data relevant to the processing of Know Your Customer (KYC) or Know Your Transaction (KYT) regulatory requirements to prevent money laundering or to verify the identity of and status of investors or purchasers or an investment product or financial product. Context may also be, without limitation, data relevant to identifying ownership parameters including, without limitation, identity; date of purchase, sale, or trade; and geographic jurisdiction related to any IDA or any qualifying transaction described within an IDA W-block for the purposes of any regulatory reporting, including tax reporting, or for the purposes of any financial reporting, including reporting required of publicly traded companies.

Figure 5:
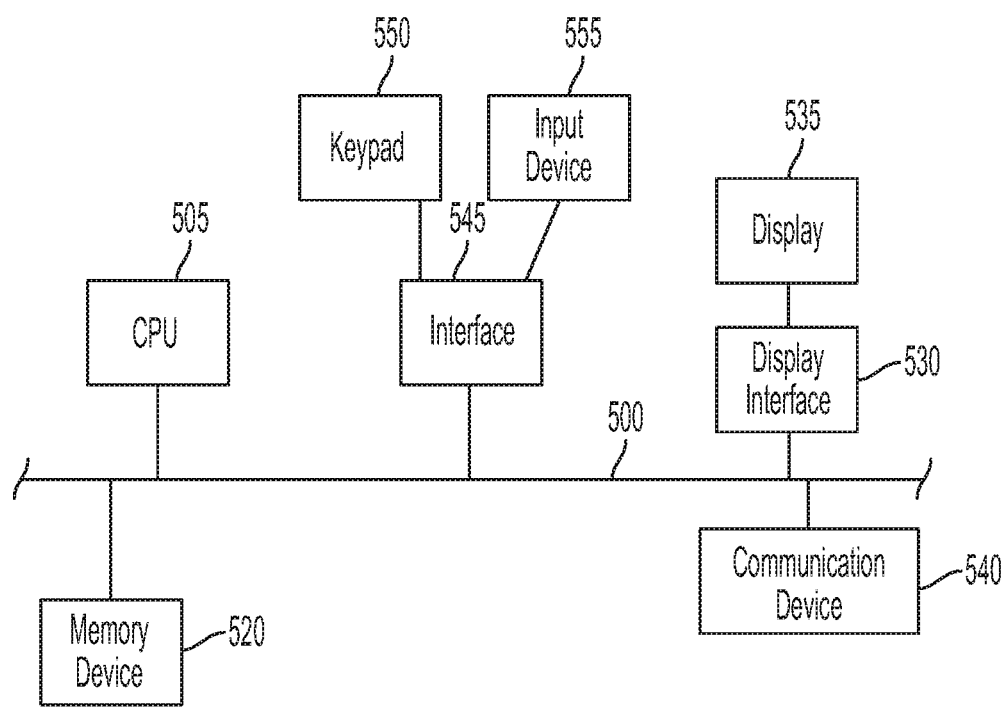
FIG. 5 illustrates a block diagram of example hardware that may be used to contain or implement program instructions according to an embodiment.

FIG. 5 illustrates example hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a processor as such term is used within this disclosure. Read only memory (ROM) and random access memory (RAM) constitute examples of non-transitory computer-readable storage media 520, memory devices or data stores as such terms are used within this disclosure.

Program instructions, software or interactive modules for providing the interface and performing any querying or analysis associated with one or more data sets may be stored in the memory device 520. Optionally, the program instructions may be stored on a tangible, non-transitory computer-readable medium such as a compact disk, a digital disk, flash memory, a memory card, a USB drive, an optical disc storage medium, a distributed computer storage platform such as a distributed ledger, a blockchain and/or other recording medium.

An optional display interface 530 may permit information from the bus 500 to be displayed on the display 535 in audio, visual, graphic or alphanumeric format. Communication with external devices may occur using various communication ports 540. A communication port 540 may be attached to a communications network, such as the Internet or an intranet.

The hardware may also include an interface 545 which allows for receipt of data from input devices such as a keypad 550 or other input device 555 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method comprising:
receiving, by an economy controller, a request from one or more sources, wherein the request comprises:
   task data associated with one or more tasks for an economy,
   context information, and
   an indication of a W-chain of a W-chain matrix to which the task data pertains, wherein the economy controller is one of a plurality of economy controllers of the economy, wherein each of the plurality of economy controllers corresponds to a participant in the economy, wherein one or more of the plurality of economy controllers is in communication with one or more other economy controllers in the plurality of economy controllers;
identifying a plurality of W-machines within the economy;
identifying from the plurality of W-machines a first W-machine, wherein the first W-machine is responsible for managing the W-chain, wherein the first W-machine is in communication with a validator machine;
transmitting at least a portion of the task data to the first W-machine;
determining, by the validator machine, whether the at least the portion of the task data corresponds to a qualifying transaction for the economy for recording in the W-chain;
in response to determining that the task data corresponds to a qualifying transaction for recording in the W-chain, determining by a second W-machine from the plurality of W-machines whether to approve recordation of the qualifying transaction to the W-chain, wherein the second W-machine is associated with a second W-chain of the W-chain matrix;
generating, by a generator machine, a W-asset that includes at least the qualifying transaction, wherein the W-asset is specific to the economy;
adding a new block to the W-chain that includes the W-asset;
transmitting, by the economy controller, the W-asset to one or more of the plurality of economy controllers.

2. The method of claim 1, wherein the task data comprises data obtained by one or more of the following:
- a mobile electronic device;
- a wearable electronic device;
- a computing device; or
- a gaming electronic device.

3. The method of claim 1, wherein determining whether the at least the portion of task data corresponds to a qualifying transaction for the economy recording in the W-chain comprises:
- determining whether a task has been completed by determining whether at least a portion of the task data satisfies a definition of one or more completed tasks for the economy; and
- in response to determining that the task has been completed, determining whether the qualifying transaction of a transaction type exists by determining whether the task satisfies a definition of the qualifying transaction or whether the task in combination with at least a portion of previously identified tasks satisfies the definition of the qualification transaction.

4. The method of claim 3, wherein adding a new block to the W-chain comprises:
- adding the qualifying transaction to a qualifying transaction pool;
- determining whether a threshold level associated with the transaction type is satisfied by determining whether one or more qualifying transactions in the qualifying transaction pool individually or collectively satisfy the threshold level associated with the transaction type; and
- in response to determining that the threshold level associated with the transaction type is satisfied, generating the W-asset comprising data pertaining to the one or more qualifying transactions in the qualifying transaction pool.

5. The method of claim 4, further comprising:
- in response to determining that the task data does not correspond to a qualifying transaction for recording in the W-chain, storing the task data in a data store that is separate from a qualifying transaction pool that stores qualifying transactions for the economy,
- wherein the W-asset further comprises data pertaining to at least a portion of the task data that does not correspond to the qualifying transaction that is stored in the data store.

6. The method of claim 4, wherein:
- the threshold level defines one or more conditions, and
- determining whether the threshold level associated with the transaction type is satisfied comprises determining whether the qualifying transactions in the qualifying transaction pool satisfy the one or more conditions.

7. The method of claim 1, further comprising, in response to determining that the task data does not correspond to a qualifying transaction for recording in the W-chain, discarding the task.

8. The method of claim 1, wherein the first W-asset and the second W-asset are the same data structure.

9. The method of claim 1, wherein the new block comprises:
- a unique identifier; and
- a transaction data list comprising information pertaining to one or more qualifying transactions associated with the W-asset.

10. The method of claim 9, wherein the new block further comprises a cryptographic reference to one or more previous blocks in the W-chain.

11. A system comprising:
one or more first electronic devices comprising:
- a first economy controller for an economy, wherein the first economy controller corresponds to a participant in the economy;
- a plurality of W-machines comprising a first W-machine, a second W-machine and a third W-machine, wherein the first W-machine, the second W-machine and the third W-machine are each in communication with the first economy controller;
- a validator machine in communication with the first W-machine;
- a generator machine in communication with the second W-machine; and
- one or more computer-readable storage media comprising one or more programming instructions that, when executed, cause:
  - the first economy controller to:
    - receive a request from one or more sources, wherein the request comprises:
      - task data associated with one or more tasks for the economy,
      - context information, and
      - an indication of a W-chain of a W-chain matrix to which the task data pertains,
    - identify the first W-machine, wherein the first W-machine is responsible for managing the W-chain, and
    - transmit at least a portion of the task data to the first W-machine,
  - the validator machine to determine whether the at least the portion of the task data corresponds to a qualifying transaction for the economy for recording in the W-chain,
  - the third W-machine to, in response to determining that the task data corresponds to a qualifying transaction for recording in the W-chain, determine whether to approve recordation of the qualifying transaction to the W-chain, wherein the third W-machine is associated with a second W-chain of the W-chain matrix,
  - the generator machine to generate a W-asset that includes at least the qualifying transaction, wherein the W-asset is specific to the economy,
  - the second W-machine to add a new block to the W-chain that includes the W-asset, and
  - the first economy controller to transmit the W-asset to one or more of the plurality of economy controllers; and
- one or more second electronic devices in communication with one or more of the first electronic devices, wherein the one or more second electronic devices comprises a second economy controller in communication with the first economy controller, wherein the second economy controller is associated with a second participant of the economy.

12. The system of claim 11, wherein the task data comprises data obtained by one or more of the following:
- a mobile electronic device;
- a wearable electronic device;
- a computing device; or
- a gaming electronic device.

13. The system of claim 11, wherein the one or more programming instructions that, when executed, cause the validator machine to determine whether the at least the portion of task data corresponds to a qualifying transaction for the economy recording in the W-chain comprise one or more programming instructions that, when executed, cause the validator machine to:
- determine whether a task has been completed by determining whether at least a portion of the task data satisfies a definition of one or more completed tasks for the economy; and
- in response to determining that the task has been completed, determine whether the qualifying transaction of a transaction type exists by determining whether the task satisfies a definition of the qualifying transaction or whether the task in combination with at least a portion of previously identified tasks satisfies the definition of the qualification transaction.

14. The system of claim 13, wherein the one or more programming instructions that, when executed, cause the first W-machine to add a new block to the W-chain comprise one or more programming instructions that, when executed, cause the first W-machine to:
- add the qualifying transaction to a qualifying transaction pool;
- determine whether a threshold level associated with the transaction type is satisfied by determining whether one or more qualifying transactions in the qualifying transaction pool individually or collectively satisfy the threshold level associated with the transaction type; and
- in response to determining that the threshold level associated with the transaction type is satisfied, generate the W-asset comprising data pertaining to the one or more qualifying transactions in the qualifying transaction pool.

15. The system of claim 14, wherein the computer-readable storage medium further comprises one or more programming instructions that, when executed, cause the first W-machine to, in response to determining that the task data does not correspond to a qualifying transaction for recording in the W-chain, store the task data in a data store that is separate from a qualifying transaction pool that stores qualifying transactions for the economy, wherein the W-asset further comprises data pertaining to at least a portion of the task data that does not correspond to the qualifying transaction that is stored in the data store.

16. The system of claim 14, wherein:
the threshold level defines one or more conditions, and
the one or more programming instructions that, when executed, cause the first W-machine to determine whether the threshold level associated with the transaction type is satisfied comprise one or more programming instructions that, when executed, cause the first W-machine to determine whether the qualifying transactions in the qualifying transaction pool satisfy the one or more conditions.

17. The system of claim 11, wherein the computer-readable storage medium further comprises one or more programming instructions that, when executed, cause the validator machine to, in response to determining that the task data does not correspond to a qualifying transaction for recording in the W-chain, discard the task.

18. The system of claim 11, wherein the first W-chain and the second W-chain are the same blockchain data structure.

19. The system of claim 11, wherein the new block comprises:
- a unique identifier; and
- a transaction data list comprising information pertaining to one or more qualifying transactions associated with the W-asset.

20. The system of claim 19, wherein the new block further comprises a cryptographic reference to one or more previous blocks in the W-chain.

* * * * *